(12) United States Patent
Kwon

(10) Patent No.: US 9,818,319 B2
(45) Date of Patent: Nov. 14, 2017

(54) WEARABLE DEVICE AND CONTROL METHOD THEREOF

(71) Applicant: DNX CO., LTD., Seoul (KR)

(72) Inventor: Eun Kyeong Kwon, Gwacheon-si (KR)

(73) Assignee: DNX CO., LTD., Seoul (KR)

( * ) Notice: Subject to any disclaimer, the term of this patent is extended or adjusted under 35 U.S.C. 154(b) by 55 days.

(21) Appl. No.: 14/779,616

(22) PCT Filed: Sep. 11, 2015

(86) PCT No.: PCT/KR2015/009563
§ 371 (c)(1),
(2) Date: Sep. 24, 2015

(87) PCT Pub. No.: WO2016/137070
PCT Pub. Date: Sep. 1, 2016

(65) Prior Publication Data
US 2016/0372016 A1  Dec. 22, 2016

(30) Foreign Application Priority Data

Feb. 27, 2015 (KR) .................. 10-2015-0028520

(51) Int. Cl.
*G09G 3/00* (2006.01)
*G09G 3/14* (2006.01)
*G06F 1/16* (2006.01)
*G06F 3/0338* (2013.01)

(52) U.S. Cl.
CPC ............ *G09G 3/004* (2013.01); *G06F 1/163* (2013.01); *G06F 3/0338* (2013.01); *G09G 3/14* (2013.01); *G09G 2354/00* (2013.01)

(58) Field of Classification Search
None
See application file for complete search history.

(56) References Cited

U.S. PATENT DOCUMENTS

| | | | | |
|---|---|---|---|---|
| 2001/0011496 | A1* | 8/2001 | Mishima | G10H 3/14 84/600 |
| 2014/0062892 | A1* | 3/2014 | Dickinson | G06F 3/0412 345/173 |
| 2016/0070464 | A1* | 3/2016 | Hong | G06F 3/04886 715/773 |
| 2016/0072554 | A1* | 3/2016 | Sharma | H04B 5/0031 455/41.1 |
| 2016/0085286 | A1* | 3/2016 | Zhou | G06F 1/1637 345/156 |

FOREIGN PATENT DOCUMENTS

KR  10-2014-0064694 A  5/2014
KR  10-2014-0137170 A  12/2014

* cited by examiner

*Primary Examiner* — Joseph Haley
*Assistant Examiner* — Emily Frank
(74) *Attorney, Agent, or Firm* — Paratus Law Group, PLLC

(57) ABSTRACT

A wearable device apparatus, comprises: a first and second housings configured to be connected with each other; a plurality of light emitters configured to be separately located and configured to emit a light through the first housing; a light guide configured to guide a direction of the light emitted from the plurality of light emitters; a plurality of force detection sensor configured to detect a force applied to a certain point of the first housing; and a control board configured to control the plurality of light emitters through detection of the plurality of force detection sensors.

13 Claims, 22 Drawing Sheets

[Fig. 1]
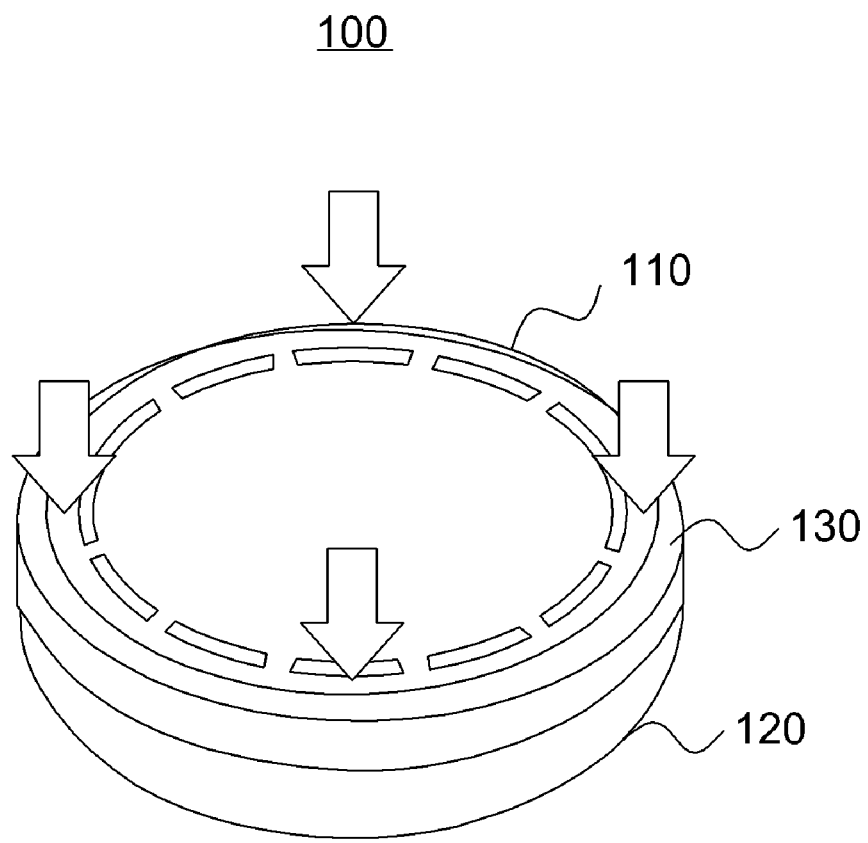

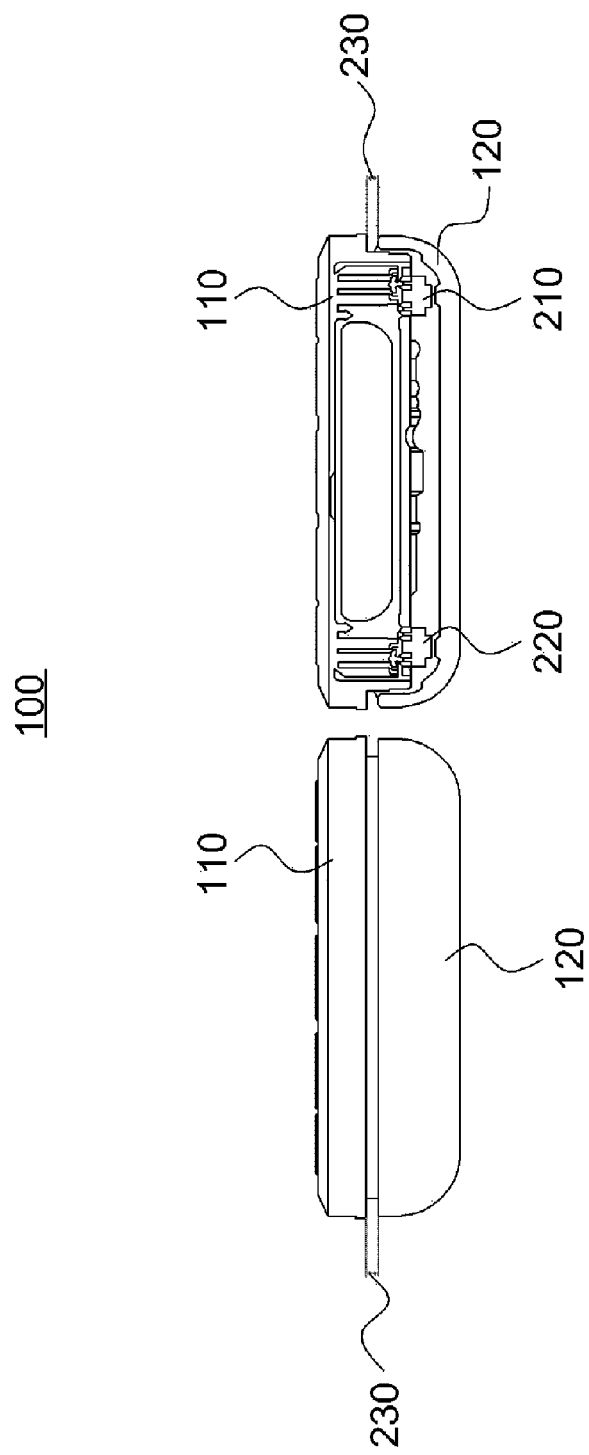
[Fig. 2]

[Fig. 3]
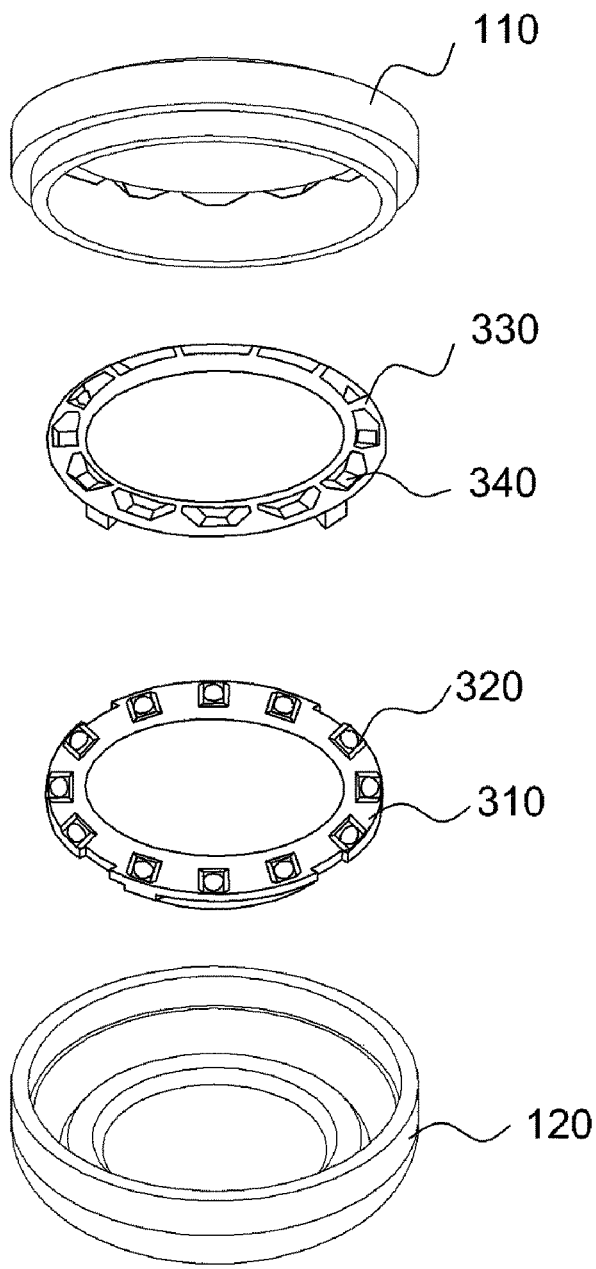

[Fig. 4]
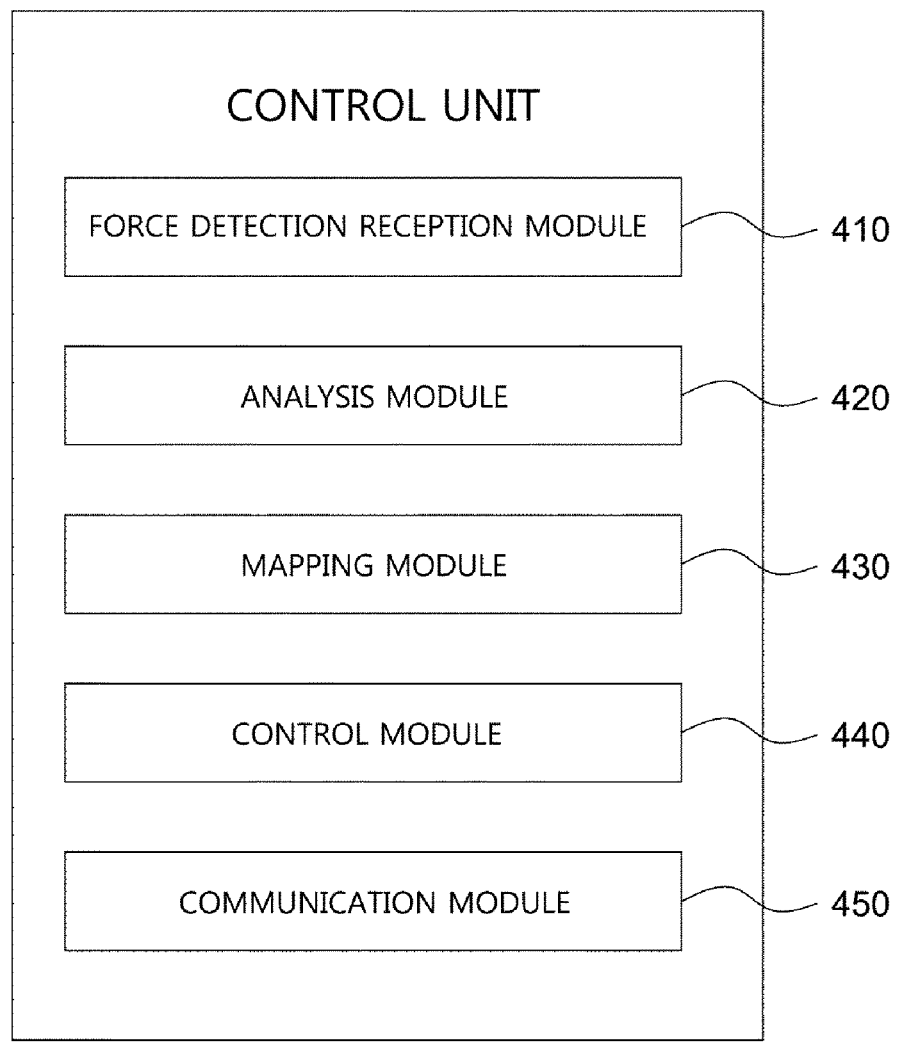

[Fig. 5]
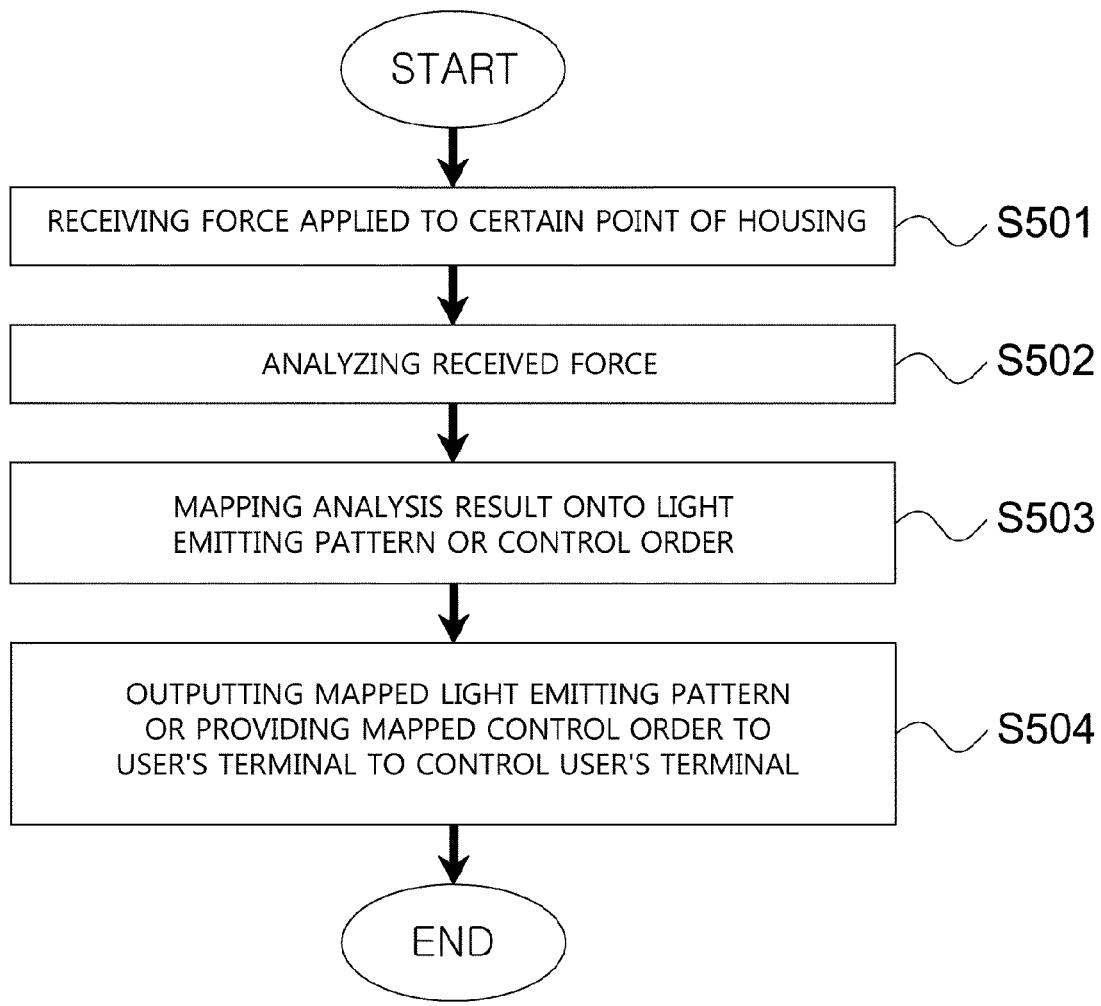

[Fig. 6]
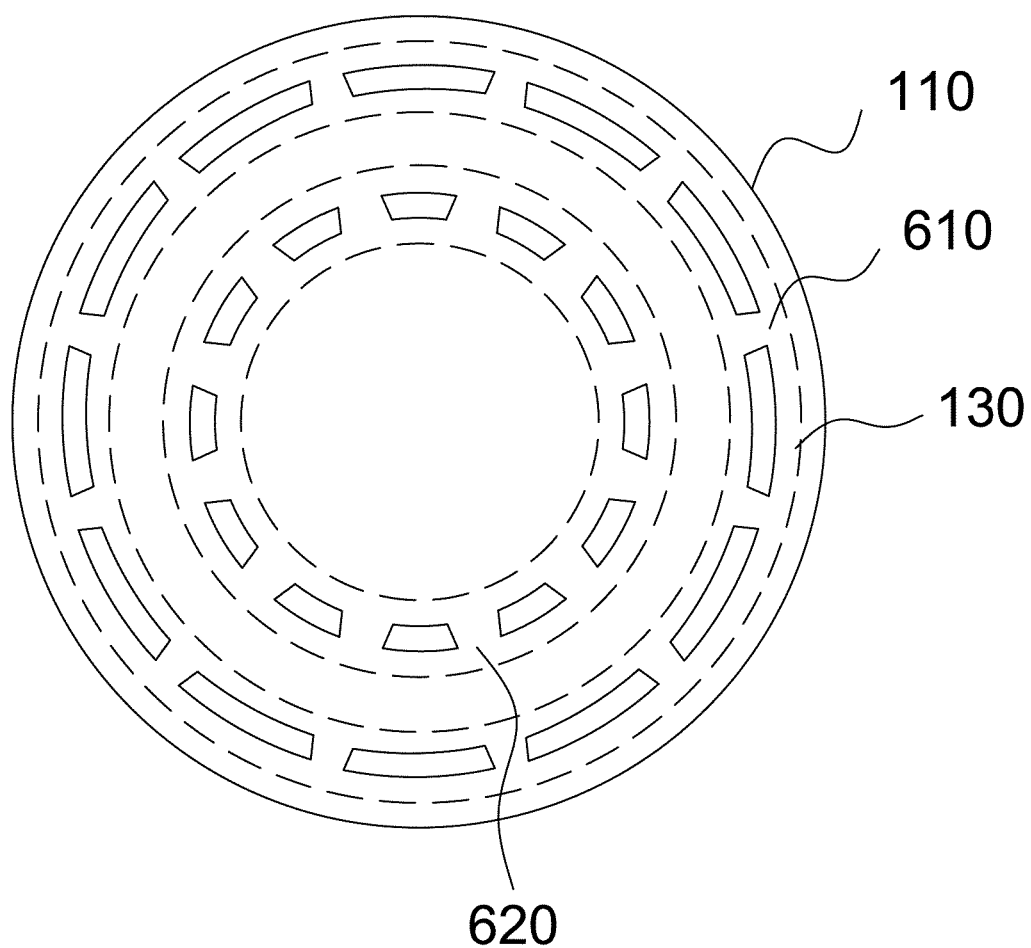

[Fig. 7]
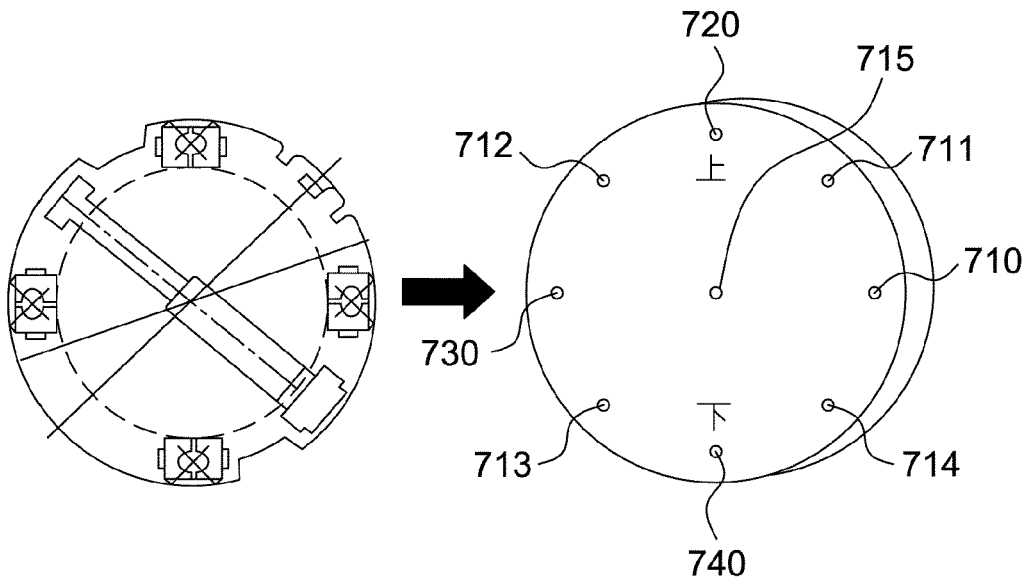
[Fig. 8]
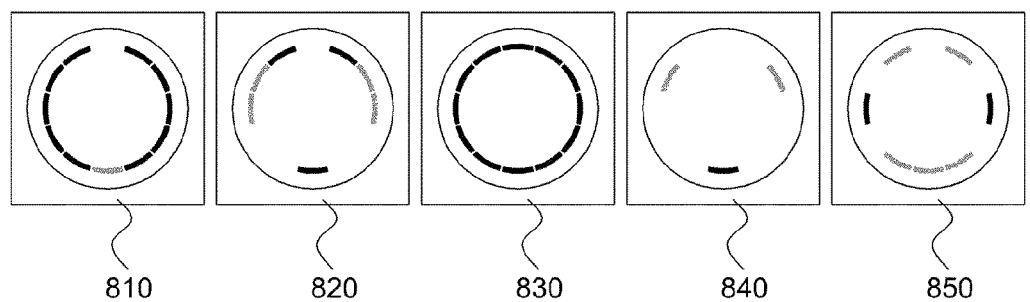

[Fig. 9]
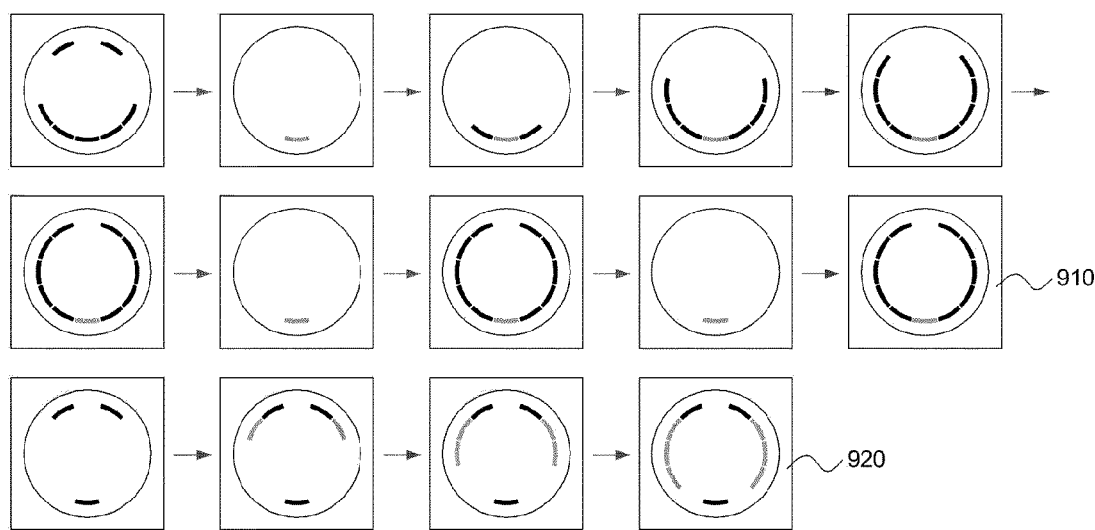

[Fig. 10]
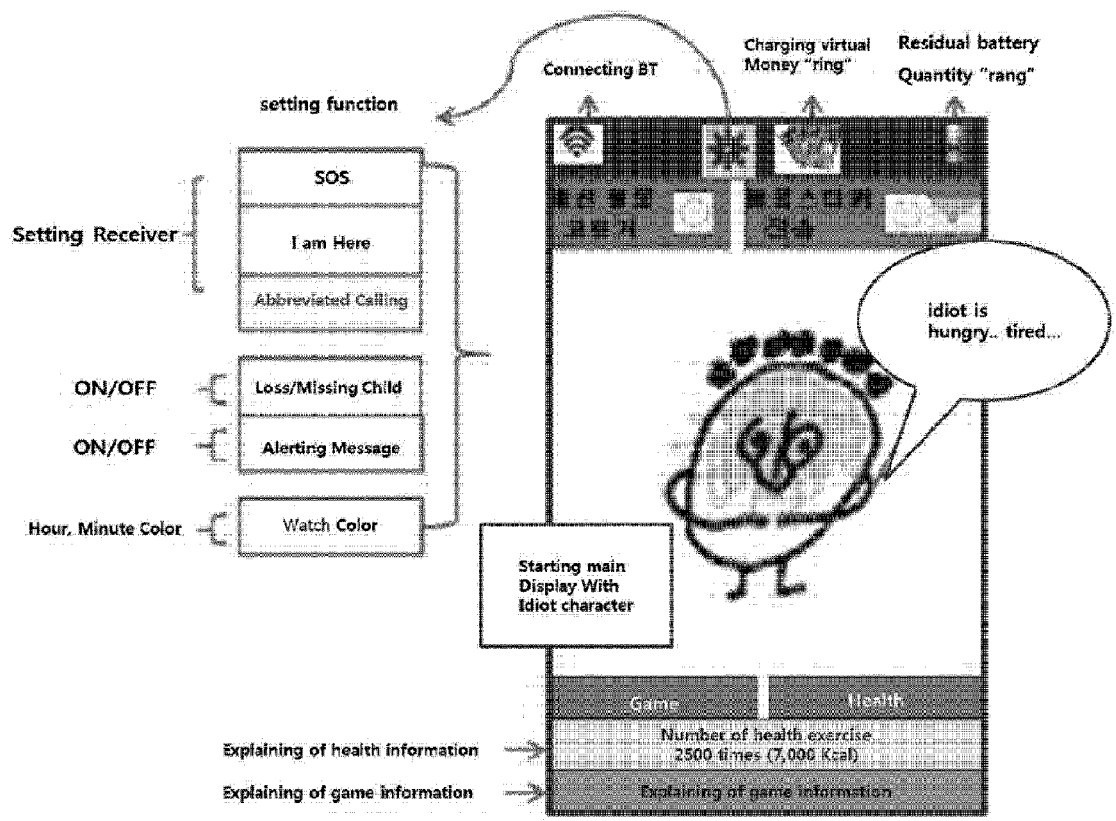

[Fig. 11]
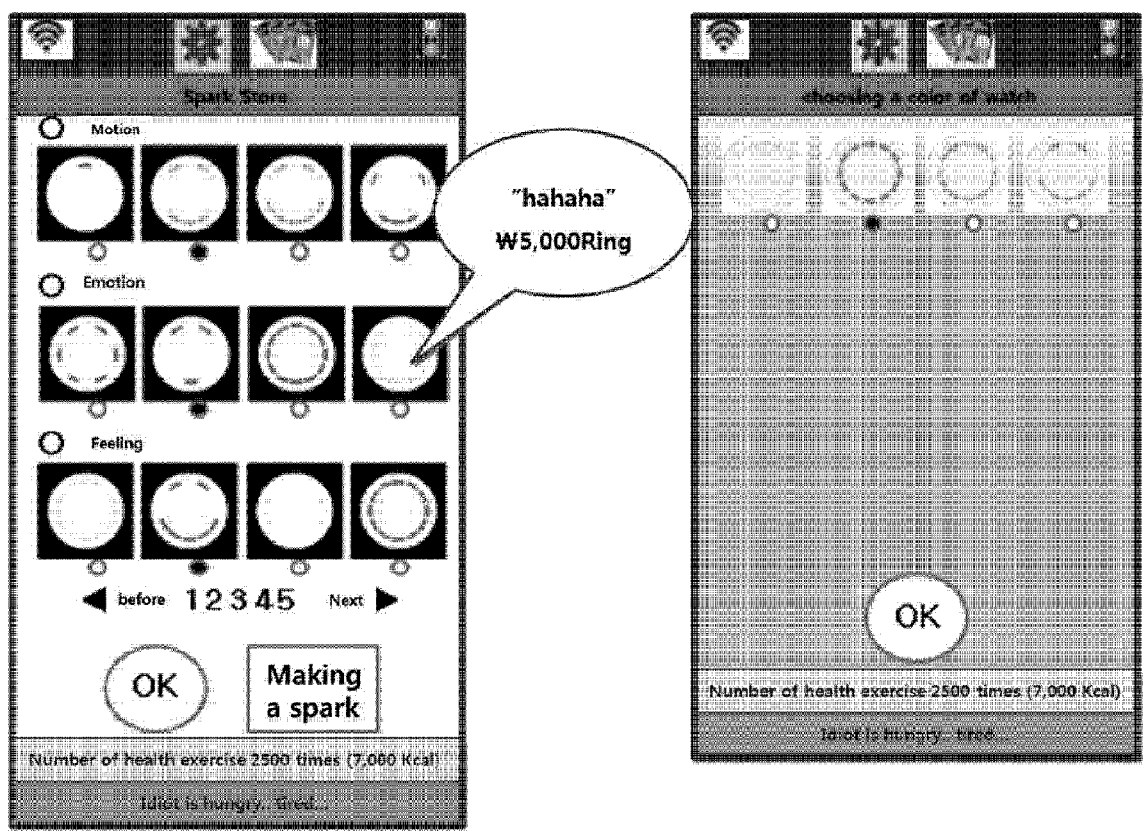

[Fig. 12]
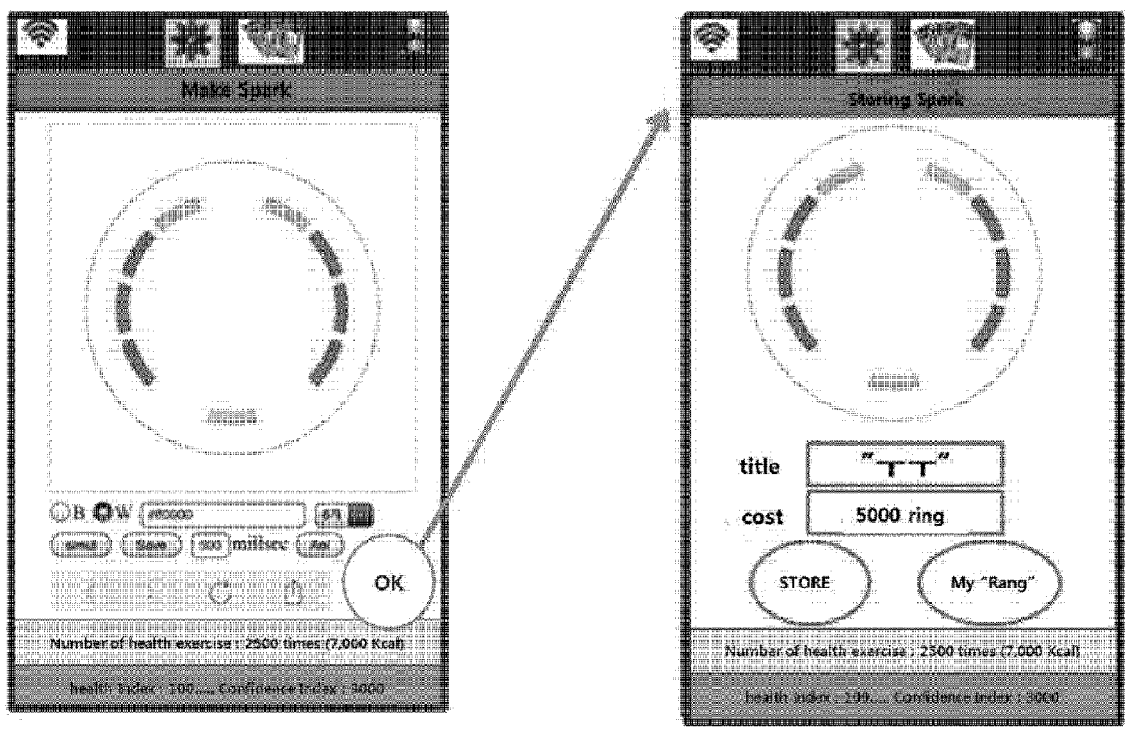

[Fig. 13]
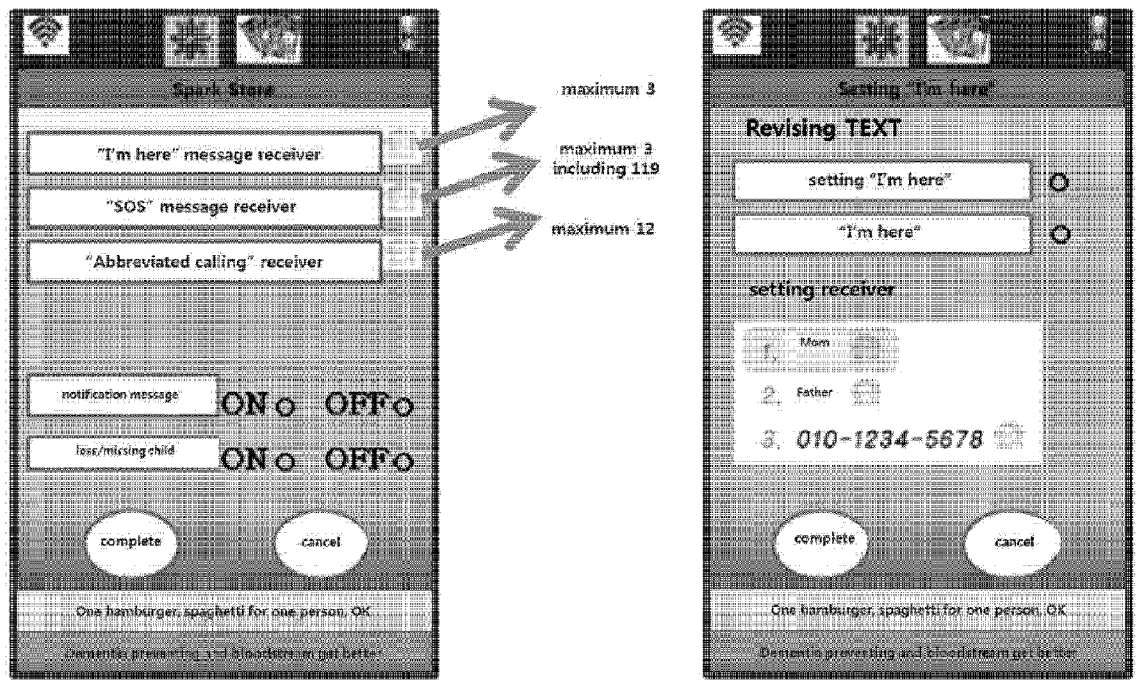

[Fig. 14]
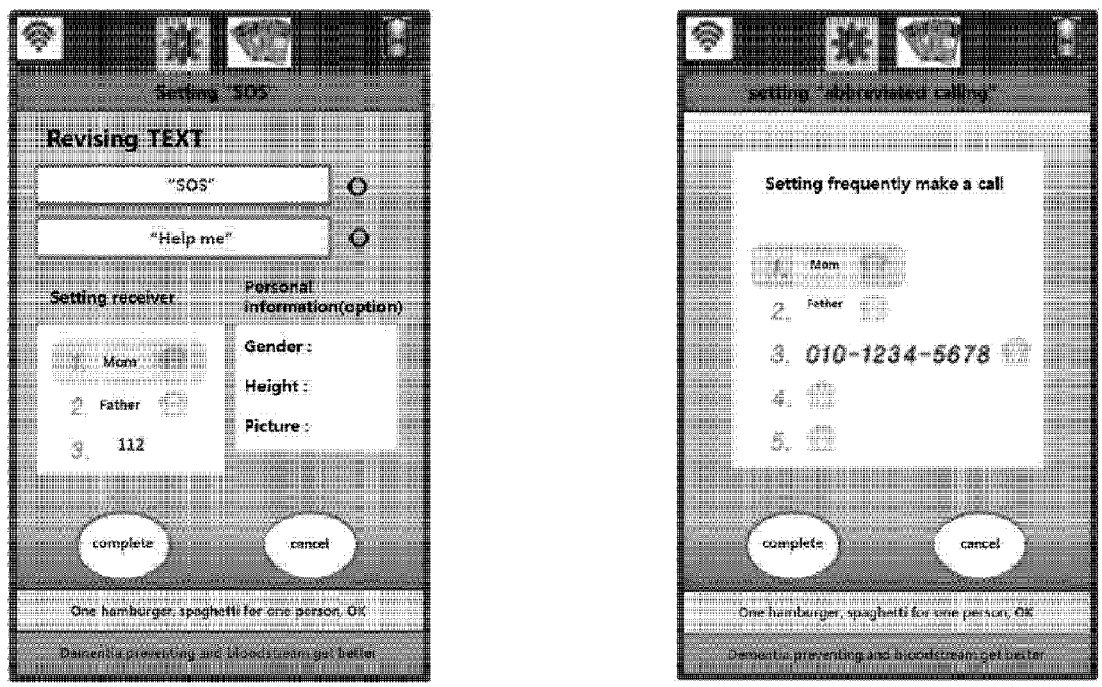

[Fig. 15]
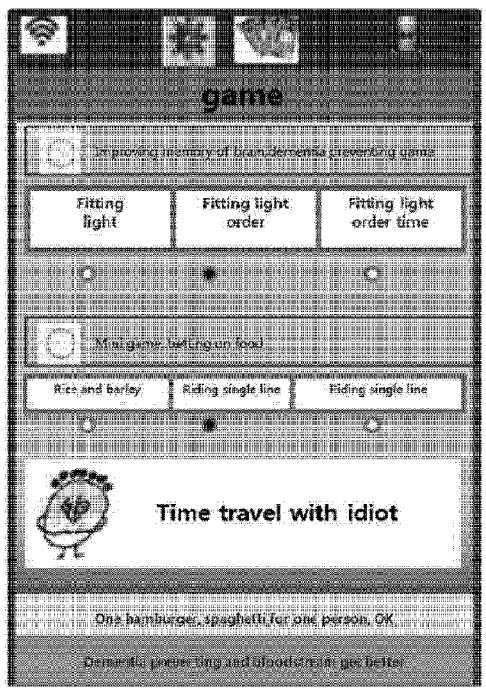
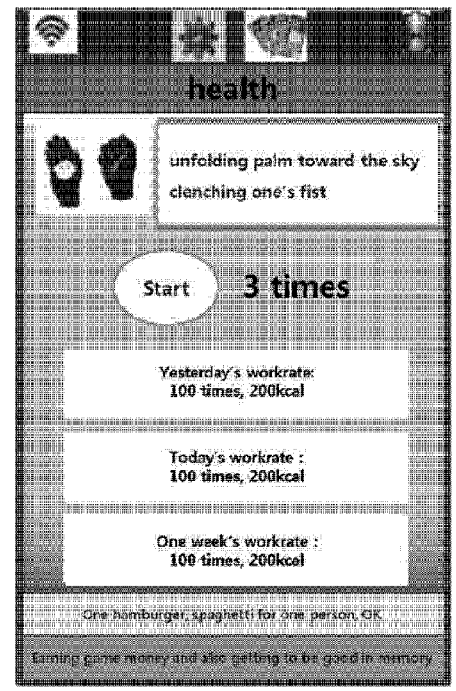

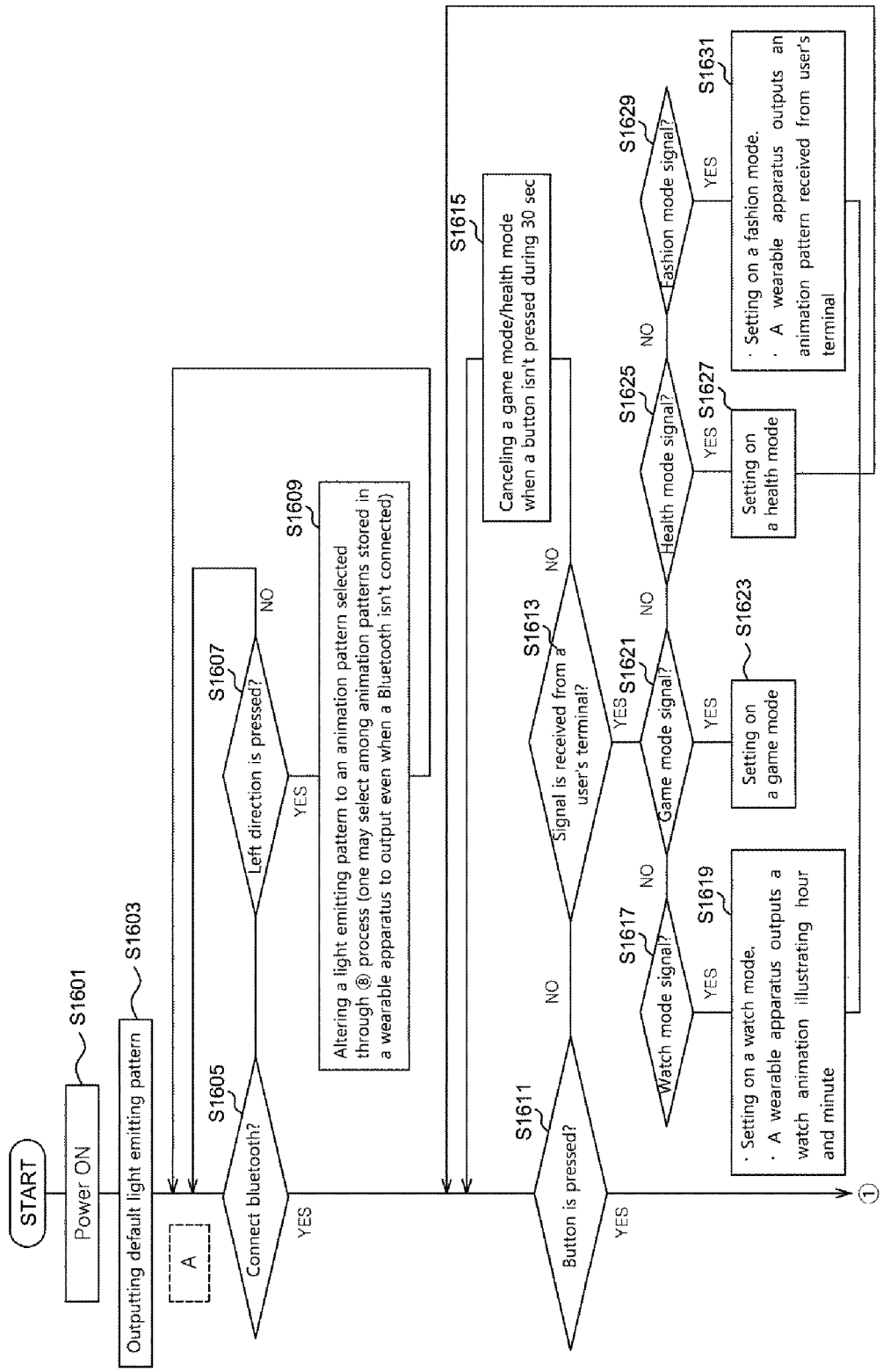
[Fig. 16]

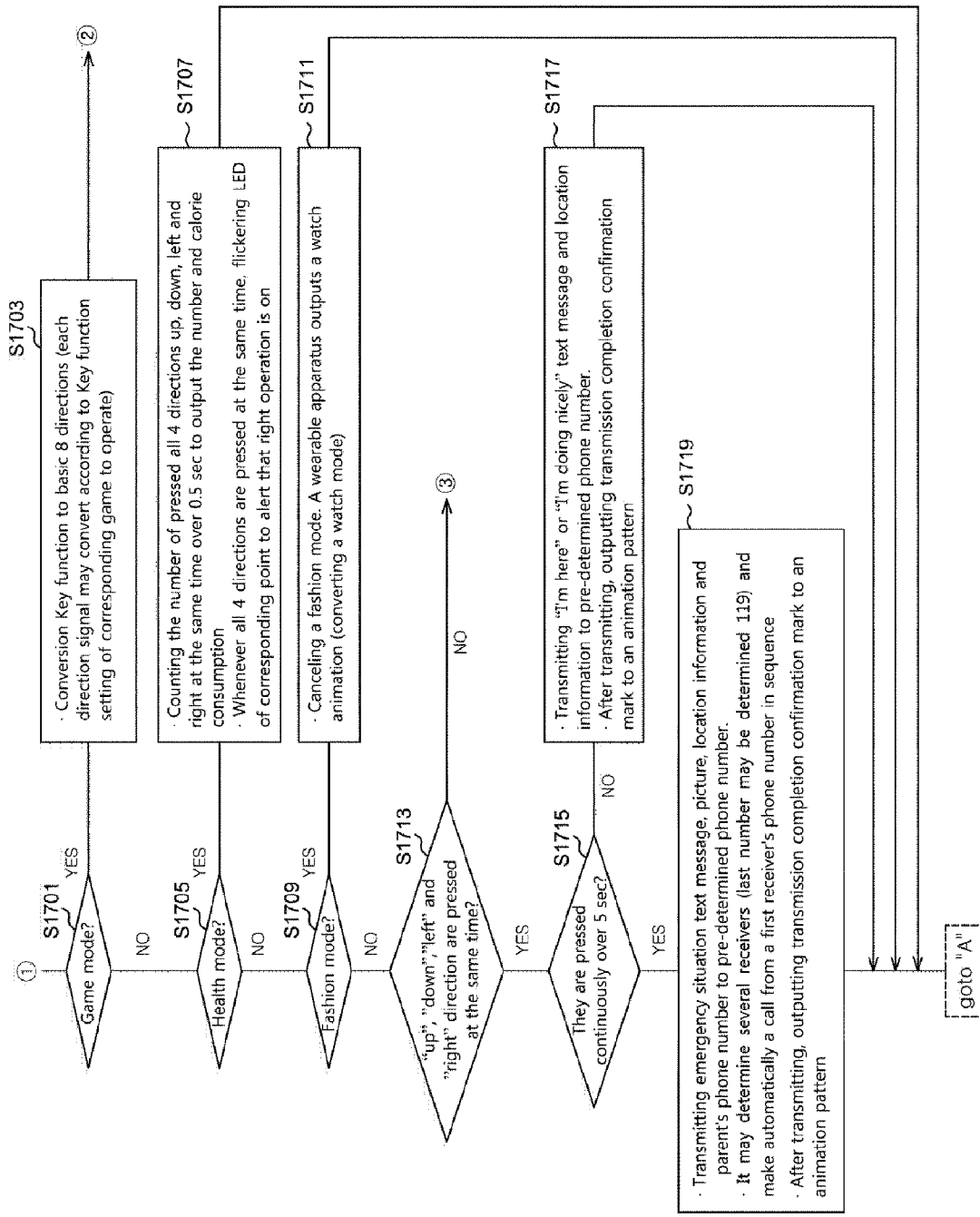
[Fig. 17]

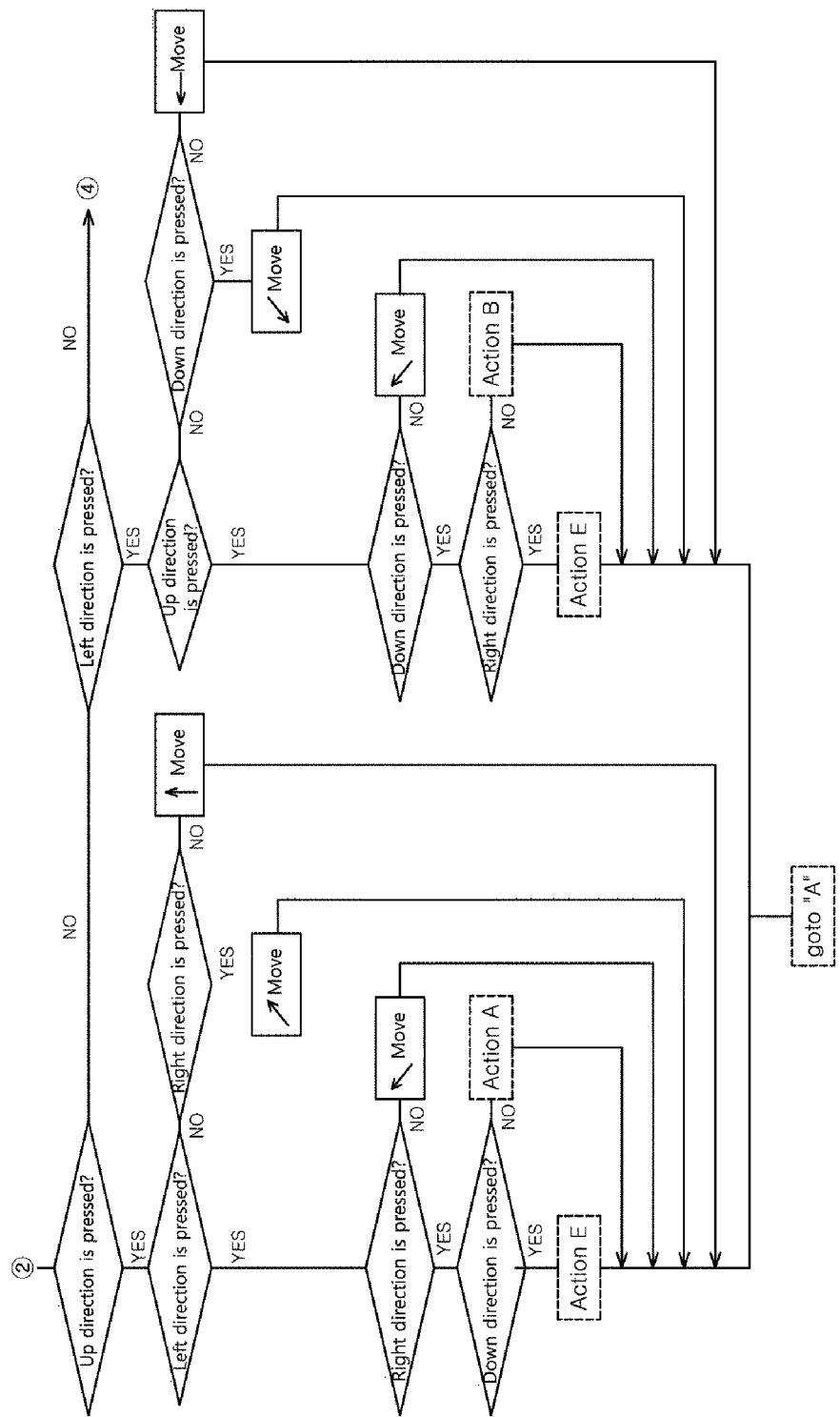
[Fig. 18]

[Fig. 19]
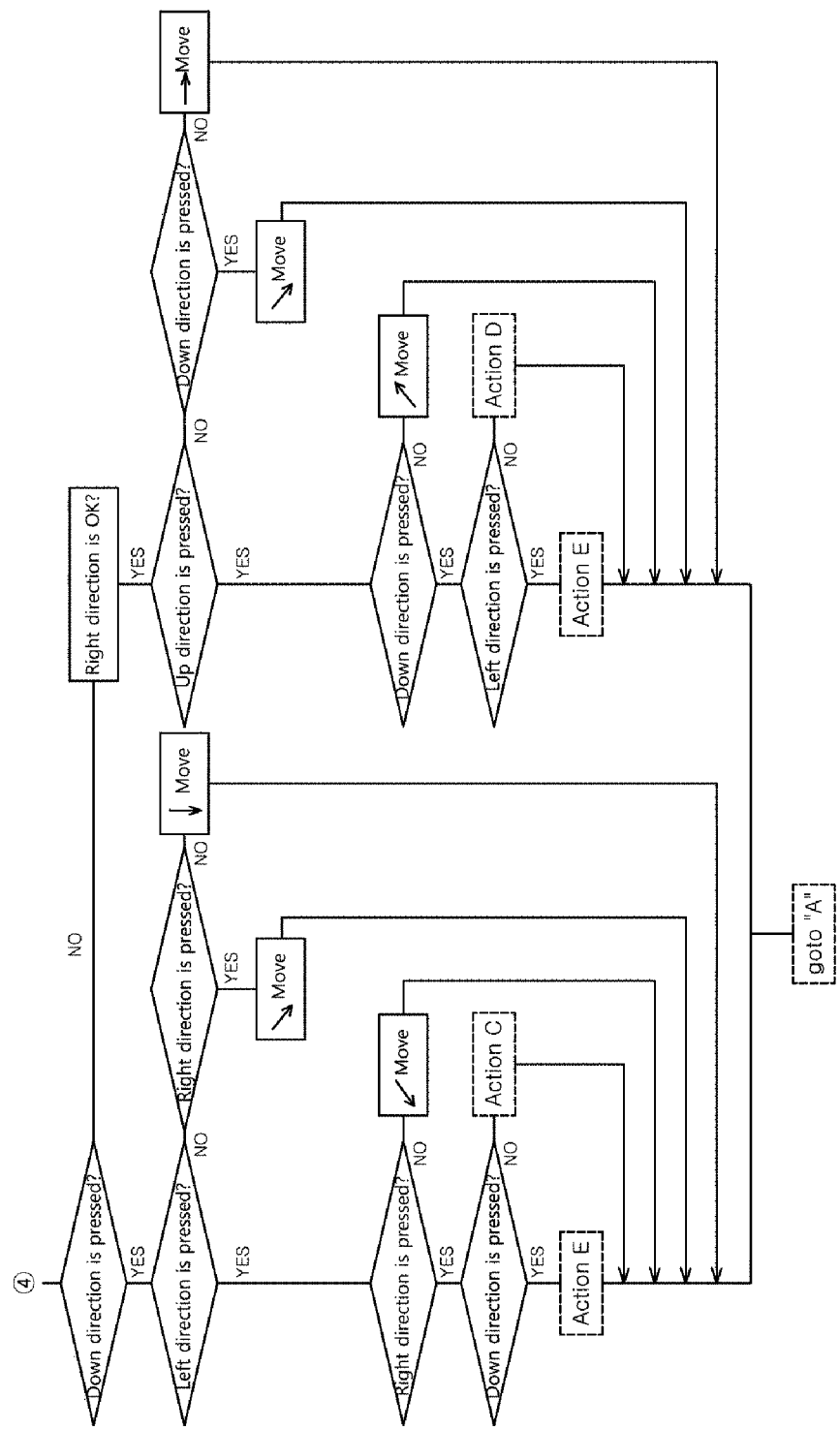

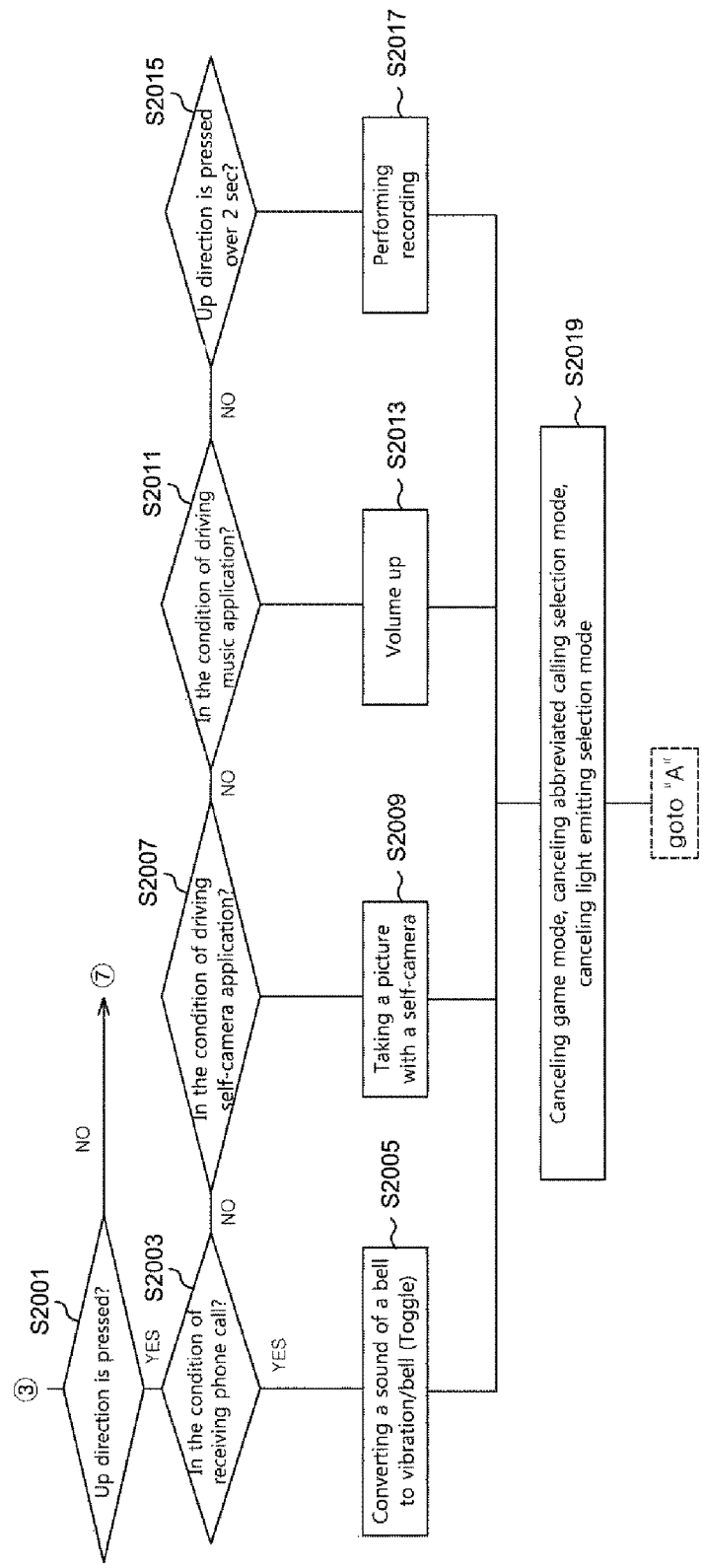
[Fig. 20]

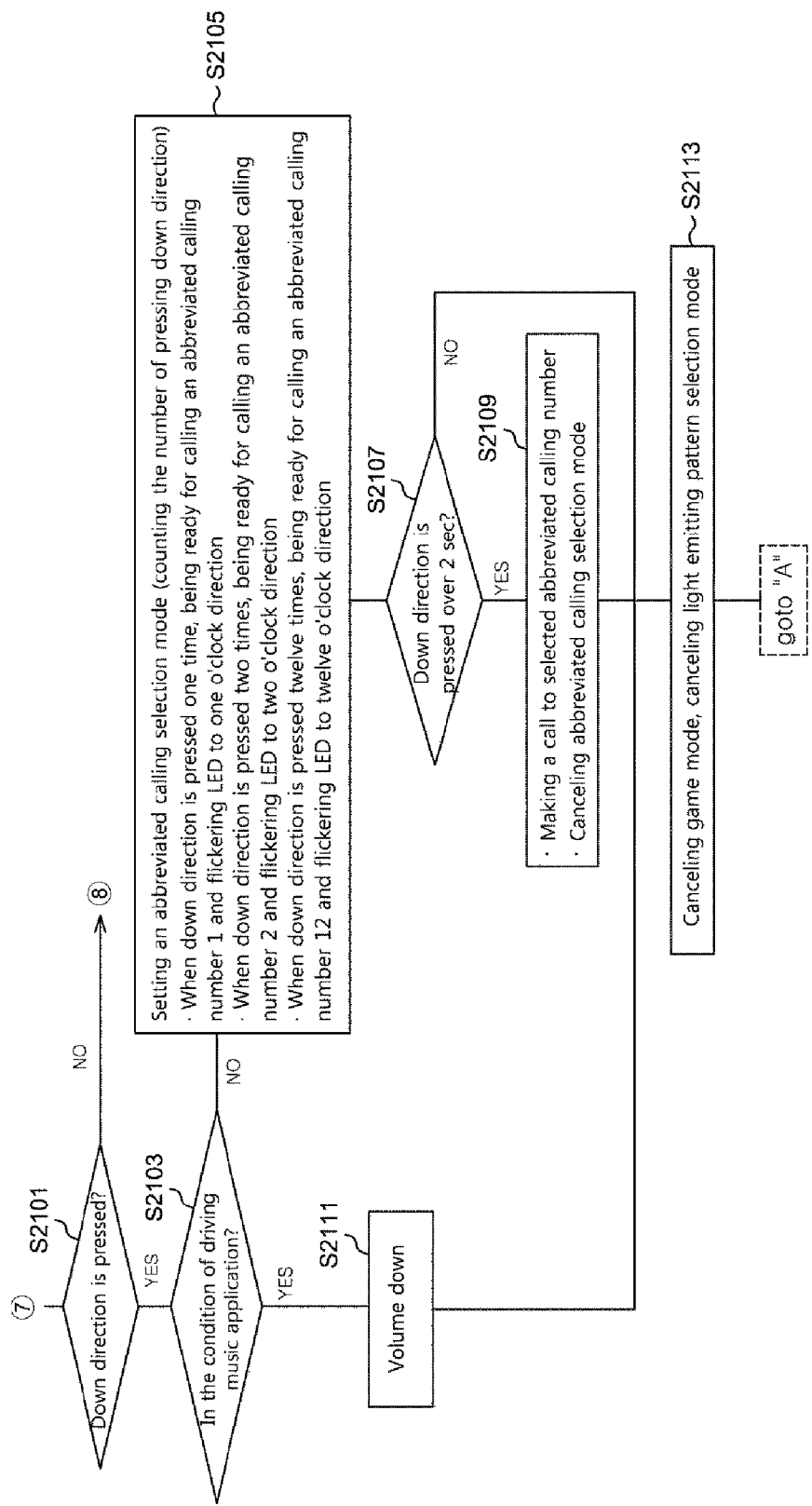
[Fig. 21]

[Fig. 22]
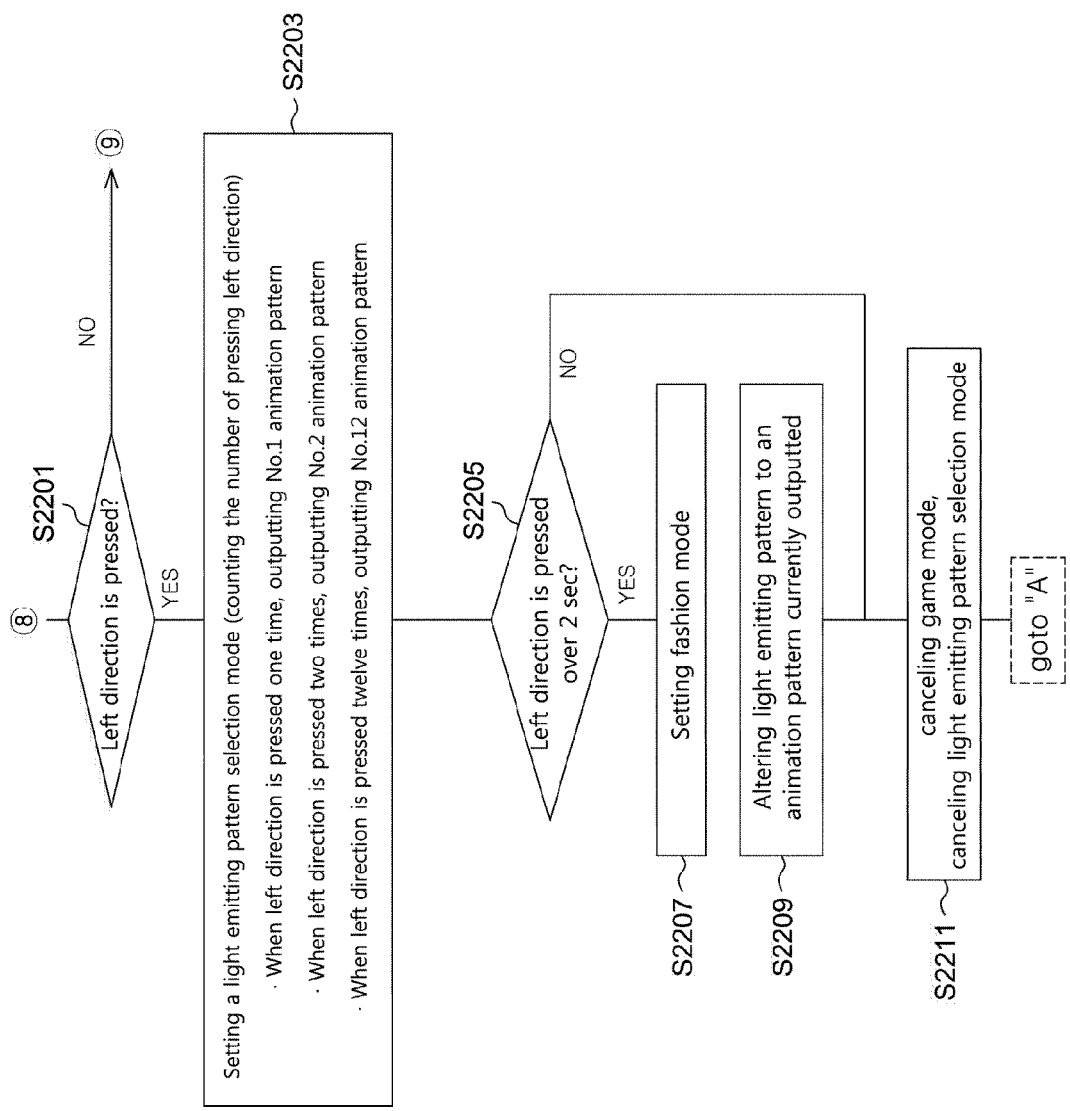

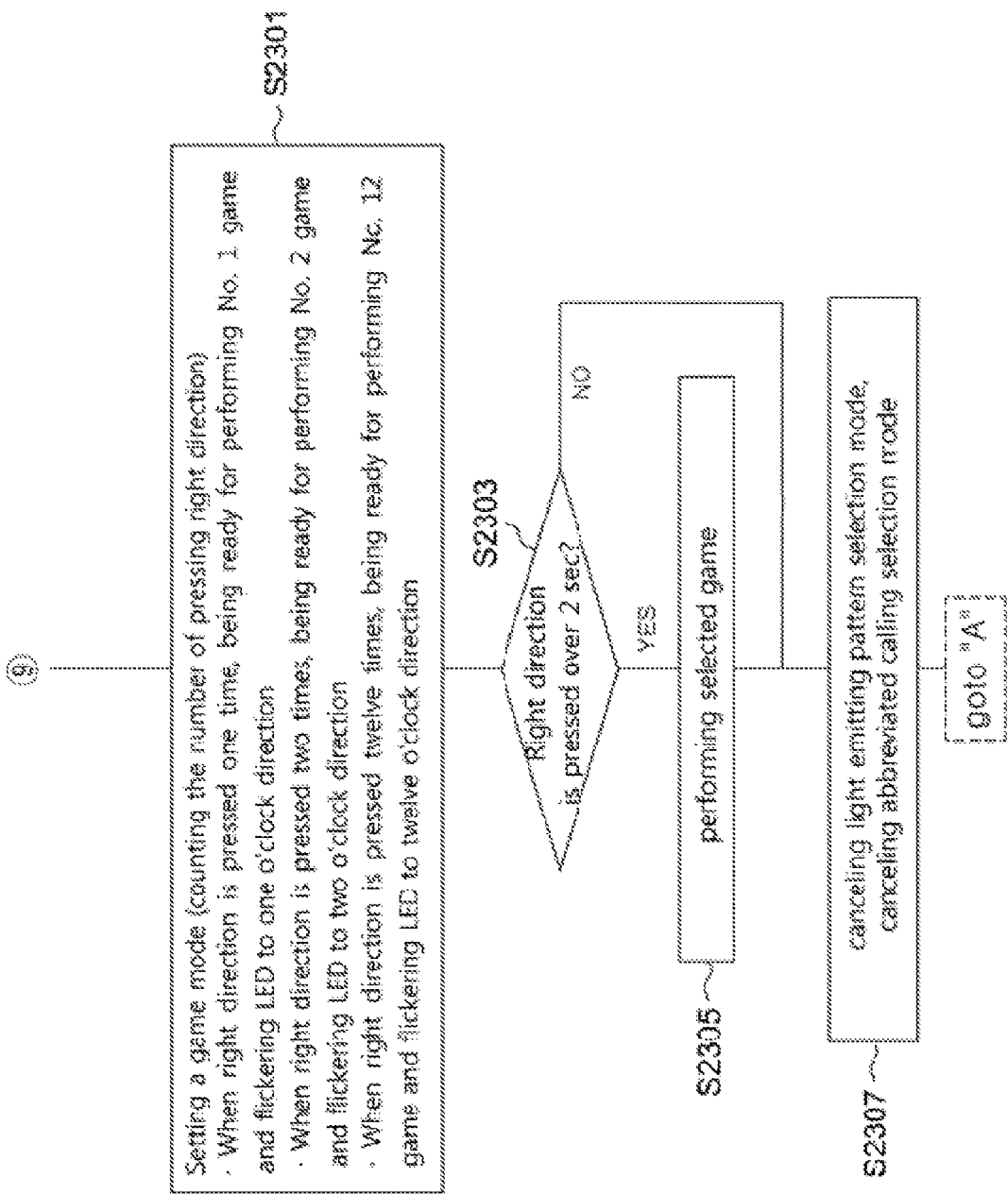
[Fig. 23]

WEARABLE DEVICE AND CONTROL METHOD THEREOF

CROSS REFERENCE TO PRIOR APPLICATION

This application is a National Stage Patent Application of PCT International Patent Application No. PCT/KR2015/009563 (filed on Sep. 11, 2015) under 35 U.S.C. §371, which claims priority to Korean Patent Application No. 10-2015-0028520 (filed on Feb. 27, 2015), which are all hereby incorporated by reference in their entirety.

TECHNICAL FIELD

This disclosure relates to a wearable device and control method thereof, more particularly, a wearable device and control method thereof for controlling a plurality of light emitters or a user's terminal based on information detected through a force detection sensor.

BACKGROUND ART

Generally, a wearable device is manufactured small, light and slim because it is always carried on oneself, fitted with fashion and kept on oneself. Therefore, most wearable device uses touch screen method or is used LCD (Liquid Crystal Display) for user's screen output as an apparatus of input/output UI/UX.

Korean Patent Publication NO. 10-2014-0137170 is related to a schedule display method and apparatus through a wearable additional equipment, it connects a schedule with synchronizable and portable electric device to display the schedule on display screen of a wearable additional apparatus and displays information that is inputted by a user into portable electric device on display screen of a wearable additional apparatus.

Korean Patent Publication NO. 10-2014-0064694 is related to a wearable electric device and user's gesture input having external sensor of the device, it detects at least partial movement of user's arm by the sensor, detects a gesture enacted by user based on at least partial movement and processes the gesture as input of a wearable apparatus.

Korean Patent Publication NO. 10-2014-0137170
Korean Patent Publication NO. 10-2014-0064694

Technical Problem

One embodiment of the present invention proposes a wearable apparatus and control method thereof that doesn't expose extra input apparatus or a plurality of sensors to outside and applies a direct force to an apparatus to input control information.

One embodiment of the present invention proposes a wearable apparatus and control method thereof that deliver meaningful message such as text message, animation or user's emotion to user, as using a plurality of light emitters to output constant pattern.

One embodiment of the present invention a wearable apparatus and control method thereof that detects a force applied to a certain point of a housing to control a plurality of light emitter or user's terminal.

Technical Solution

In some embodiments, a wearable device apparatus includes a first and second housings configured to be connected with each other, a plurality of light emitters configured to be separately located and configured to emit a light through the first housing, a light guide configured to guide a direction of the light emitted from the plurality of light emitters, a plurality of force detection sensor configured to detect a force applied to a certain point of the first housing and a control board configured to control the plurality of light emitters through detection of the plurality of force detection sensors.

In one embodiment, the first and second housings may be separately located at the edges and temporarily reduce a separation distance through the force.

In one embodiment, as the separation distance of the first and second housing reduces, the control board may control the plurality of light emitters according to pattern detected through the plurality of force detection sensors.

In one embodiment, the first and second housings may be protruded toward a direction of the detection sensors from a location where the plurality of force detection sensors are disposed.

In one embodiment, the light guide may guide the light to be outputted in a separated plurality of arcs or a separated plurality of straight lines.

In one embodiment, the light guide may guide the light to be outputted in one circle or double circles consisting of a separated plurality of arcs or a separated plurality of straight lines.

In one embodiment, the plurality of light emitters may be located in a certain figuration on the control board and embodied through LED (Light Emitting Diode).

In one embodiment, the plurality of light emitters may be located in at least one more figuration among a circle, triangle, quadrangle, pentagon, hexagon, octagon and star on the control board.

In one embodiment, the plurality of force detection sensors may be located between the first and second housing not to be exposed outwards.

In one embodiment, wherein the plurality of force detection sensors may be located in 4 directions and a center based on the center of the first housing on the control board.

In one embodiment, the 4 directions may be up, down, left and right directions.

In one embodiment, the control board may include a control unit configured to control the plurality of light emitters through detection of the plurality of force detection sensors.

In one embodiment, the control unit may set the wearable device with a certain mode according to the pattern detected through the plurality of force detection sensors.

In one embodiment, the control unit may alter detection patterns which may be detected through the plurality of force detection sensors according to the type of the certain mode.

In one embodiment, the control unit may perform transmission and reception of data with user's terminal that is able to execute a certain application.

In one embodiment, the control unit may control the plurality of light emitters through a manipulation of the certain application of the user's terminal.

In one embodiment, the control unit may control the plurality of light emitters according to a type of application executed by the user's terminals, a type of operations executed by the application or whether the application are normally executed or not.

In one embodiment, the control unit may control the user's terminal through detecting of the plurality of force detection sensors.

In one embodiment, the control unit may analyze a physical and time series combination in respect of detection of the plurality of force detection sensors.

In one embodiment, the control unit may map analysis result in respect of the detection onto one of a light emitting pattern in respect of the plurality of light emitters and a control order in respect of the user's terminal.

In one embodiment, the control unit may output the mapped light emitting pattern through the plurality of light emitters.

In one embodiment, the control unit may output at least one more pattern among the following animation pattern through the plurality of light emitters.

In one embodiment, the control unit may transmit the mapped control order to the user's terminal.

In one embodiment, the control unit may control the user's terminal based on the control order.

In one embodiment, in case that detection through at least one force detection sensor 210 isn't during certain time, the control unit may discontinue or terminate the work of application performed at the user's terminal.

In one embodiment, the control unit may make one set among a flicker condition of the plurality of light emitters, a flicker method, the number of flicker and a type of color through the user's terminal.

In one embodiment, the flicker method may include one among a flicker order in respect of each the plurality of light emitters, a flicker time and adjustment of brightness.

In one embodiment, the control unit may make light pattern emitted through the plurality of light emitters identically output to the user's terminal.

In one embodiment, the wearable apparatus control method includes (a) an outputting default light emitting pattern by the control unit when the wearable apparatus operates, (b) a checking whether the control unit connects with the user's terminal through a wireless communication and (c) a selecting one among light patterns associated with the wearable apparatus in accordance with a user's control by the control unit to output the selected light pattern when the control unit doesn't connect with the user's terminal.

In one embodiment, construction equipment further includes a worker input device configured to output a boom float mode selection signal according to an operation of a worker wherein the control unit applies or cancels one or more of the float mode according to the boom float mode selection signal.

Technical Effects

A wearable apparatus and control method thereof according to one embodiment of the present invention may not use extra input apparatus, may not expose a plurality of sensors outwards and may apply direct force to an apparatus to input control information.

A wearable apparatus and control method thereof according to one embodiment of the present invention may use a plurality of light emitters to output constant pattern and may deliver meaningful message such as text message, animation or user's emotion to user.

A wearable apparatus and control method thereof according to one embodiment of the present invention may detect a force applied to a certain point of a housing to control a plurality of light emitter or user's terminal.

DESCRIPTION OF DRAWINGS

FIG. 1 is a draw for a wearable apparatus according to one embodiment of the present invention.

FIG. 2 is a side view and a cross-sectional diagram for a wearable apparatus in FIG. 1.

FIG. 3 is a specific draw for component of a wearable apparatus in FIG. 1.

FIG. 4 is a block diagram for a control unit of a wearable apparatus in FIG. 1.

FIG. 5 is a flow chart for a wearable apparatus control method performed through a wearable apparatus.

FIG. 6 is an example for disposition of a plurality of light emitters or penetration unit.

FIG. 7 is an example for disposition of a plurality of force detection sensors.

FIG. 8 is an example for a light pattern outputted through a plurality of light emitters FIG. 9 is another example for a light pattern outputted through a plurality of light emitters.

FIG. 10 is a draw illustrating a screen of an application controlling a wearable apparatus in user's terminal.

FIG. 11 is a draw illustrating a screen setting watch condition and a screen purchasing a light emitting pattern in an application in FIG. 10.

FIG. 12 is a draw illustrating a screen storing a generated light emitting pattern and a screen generating new light emitting pattern in an application in FIG. 10.

FIG. 13 is a draw illustrating a screen setting transmission function a message as usual and a screen setting a function of a wearable apparatus in an application in FIG. 10.

FIG. 14 is a draw illustrating a screen setting number of an abbreviated calling and a screen setting an emergency situation transmission function in an application in FIG. 10.

FIG. 15 is a draw illustrating a result screen performing a health mode and a screen setting a game in an application in FIG. 10.

FIG. 16 to FIG. 23 is a flow chart for a control method of a wearable apparatus.

MODE FOR INVENTION

Explanation of the present invention is merely an embodiment for structural or functional explanation, so the scope of the present invention should not be construed to be limited to the embodiments explained in the embodiment. That is, since the embodiments may be implemented in several forms without departing from the characteristics thereof, it should also be understood that the described embodiments are not limited by any of the details of the foregoing description, unless otherwise 20 specified, but rather should be construed broadly within its scope as defined on the appended claims. Therefore, various changes and modifications that fall within the scope of the claims, or equivalents of such scope are therefore intended to be embraced by the appended claims.

Terms described in the present disclosure may be understood as follows.

While terms such as "first" and "second," etc., may be used to describe various components, such components must not be understood as being limited to the above terms. The above terms are used to distinguish one component from another. For example, a first component may be referred to as a second component without departing from the scope of rights of the present invention, and likewise a second component may be referred to as a first component.

It will be understood that when an element is referred to as being "connected to" another element, it can be directly connected to the other element or intervening elements may also be present. In contrast, when an element is referred to as being "directly connected to" another element, no intervening elements are present. In addition, unless explicitly described to the contrary, the word "comprise" and variations such as "comprises" or "comprising," will be understood to imply the inclusion of stated elements but not the exclusion of any other elements. Meanwhile, other expressions describing relationships between components such as "between", "immediately between" or "adjacent to" and "directly adjacent to" may be construed similarly.

Singular forms "a", "an" and "the" in the present disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Identification letters (e.g., a, b, c, etc.) in respective steps are used for the sake of explanation and do not described order of respective steps. The respective steps may be changed from a mentioned order unless specifically mentioned in context. Namely, respective steps may be performed in the same order as described, may be substantially simultaneously performed, or may be performed in reverse order.

The present invention may be implemented as machine-readable codes on a machine-readable medium. The machine-readable medium includes any type of recording device for storing machine-readable data. Examples of the machine readable recording medium include a read-only memory (ROM), a random access memory (RAM), a compact disk-read only memory (CD-ROM), a magnetic tape, a floppy disk, and optical data storage. The medium may also be carrier waves (e.g., Internet transmission). The computer-readable recording medium may be distributed among networked machine systems which store and execute machine-readable codes in a de-centralized manner.

The terms used in the present application are merely used to describe particular embodiments, and are not intended to limit the present invention. Unless otherwise defined, all terms used herein, including technical or scientific terms, have the same meanings as those generally understood by those with ordinary knowledge in the field of art to which the present invention belongs. Such terms as those defined on a generally used dictionary are to be interpreted to have the meanings equal to the contextual meanings in the relevant field of art, and are not to be interpreted to have ideal or excessively formal meanings unless clearly defined on the present application.

FIG. 1 is a draw for a wearable apparatus according to one embodiment of the present invention.

Referring to FIG. 1, a wearable apparatus 100 includes a first housing 110 and a second housing 120, herein, a first housing 110 and a second housing 120 connects with each other.

A first housing 110 is a circular figuration and protrudes in vertical direction from the edge of a circular board up to a certain length. A second housing 120 is a figuration corresponding to a figuration of a first housing 110 and connects with a first housing 110. In one embodiment, a figuration of a first housing 110 and a second housing 120 may not be limited to circular figuration and may variously alter.

In one embodiment, a first housing 110 may include at least one penetration unit 130 consisting of penetration element. A penetration unit 130 may be disposed around the edge or be disposed a location corresponding to a location of a light emitter disposed at a lower terminal of a first housing 110. In one embodiment, a figuration, shape and disposition of a penetration unit 130 may variously alter. For example, when a light emitter is disposed at a lower terminal of a first housing 110 in a circular figuration, a penetration unit 130 may be disposed at an upper light emitter in one ring figuration or in ring figuration divided into a plurality of sections.

For example, referring to FIG. 6, when a light emitter may be disposed at a lower terminal of a first housing 110 in double circular figuration, a penetration unit 130 may be disposed in double circular figuration 610 and 620 along with a location of a light emitter.

In one embodiment, a penetration unit 130 may emit a light from a light emitter disposed at a lower terminal of a first housing 110 and may penetrate the light guided through a light guide to provide corresponding light of a first housing 110 outwards.

FIG. 2 is a side view and a cross-sectional diagram for a wearable apparatus in FIG. 1.

Referring to FIG. 2, a first housing 110 and a second housing 120 are separately located at the edges to be formed certain separation distance 230. In one embodiment, a first housing 110 and a second housing 120 may form drift space through certain separation distance 230 and may temporarily decrease certain separation distance 230 through a force applied to certain point of a first housing 110.

The inside of a first housing 110 and a second housing 120, a plurality of force detection sensors 210 and 220 are disposed at certain point forming into angle of 90° with a first housing 110 and a second housing 120. A first housing 110 or a second housing 120 may be protruded toward a plurality of force detection sensors 210 and 220 at the point disposed a plurality of force detection sensors 210 and 220. A plurality of force detection sensors 210 and 220 dispose between a first housing 110 and a second housing 120 not to expose outwards and detect a force applied to a certain point of a first housing 110.

In one embodiment, a plurality of force detection sensors 210 and 220 may be disposed toward 4 directions on a control board based on a center of a first housing 110. In one embodiment, extra force detection sensor may be disposed at the center of a control board. For example, referring to FIG. 7, the inside of a first housing 110 and a second housing 120, a first detection sensor 710, a second detection sensor 720, a third detection sensor 730 and a fourth detection sensor 740 may be disposed at up, down, left and right of the edge based on a center 715 of a first housing 110. For convenient explanation in the following, a case that a first detection sensor 710 is disposed at right side, a second detection sensor 720 is disposed at upside, a third detection sensor 730 is disposed at left side and a fourth detection sensor 740 is disposed at down side is supposed to be explained. A disposition point of each detection sensor may be different according to embodied example.

FIG. 3 is a specific draw for component of a wearable apparatus in FIG. 1.

Referring to FIG. 3, a wearable apparatus 100 includes a first housing 110 and a second housing 120 and a control board 310 formed into a circuit board including a light guide 330 and at least one light emitter 320 between a first housing 110 and a second housing 120.

A light guide 330 guides a direction of light emitted from at least one light emitter 320. In one embodiment, a light guide 330 may be manufactured in order to penetrate light at a point corresponding to disposition of at least one light emitter 320. A light guide 330 gathers or diffuses light emitted from a light emitter 320 through at least one guide unit 340 disposed at the point corresponding to the point of a light emitter 320. In one embodiment, a light guide 330 may be manufactured connected form with at least one guide unit 340 constant figuration such as circle, triangle and quadrangle.

A light guide 330 guides light emitted from a light emitter 320 to output constant type of light to a penetration unit 130 of a first housing 110. For example, a light guide 330 may be output constant type of light such as arc, straight line, quadrangle and circle.

In one embodiment, a light guide 330 may guide the light to be outputted in a separated plurality of arcs or a separated plurality of straight lines. For example, referring to FIG. 6, a plurality of guide unit 340 of arc or straight line may be disposed form of one circle or double circles (another circle in a circle) in the light guide 330. Through a guide unit 340 disposed like this, a light guide 330 may guide the light to be outputted in form of one circle or double circles consisting of a separated plurality of arcs or a separated plurality of straight lines.

In one embodiment, at least one light emitter 320 may be embodied through LED (Light Emitting Diode) and may be disposed in a certain figuration on a control board 310. For example, at least one light emitter 320 may be disposed in a figuration including circle, triangle, quadrangle, pentagon, hexagon, octagon and star on a control board 310.

A control board 310 controls at least one light emitter 320 through at least one force detection sensor 210. For example, as the separation distance of the first and second housing reduces, a control board 310 may control at least one more light emitters 320 according to pattern detected through at least one more force detection sensors 210. In one embodiment, a control board 310 formed into a circuit board may include at least one force detection sensor 210 at a lower terminal.

FIG. 4 is a block diagram for a control unit of a wearable apparatus in FIG. 1.

Referring to FIG. 4, a control unit of a control board 310 includes a force detection reception module 410, an analysis module 420, a mapping module 430, a control module 440 and a communication module 450.

A force detection reception module 410 receives an electrical signal in respect of force detected from at least one force detection sensor 210. In one embodiment, a force detection reception module 410 may receive an electrical signal of various physical and time series combination from at least one force detection sensor 210, for example, may receive an electrical signal in respect of force simultaneously detected from a plurality of force detection sensor 210 or an electrical signal in respect of force gradually detected from at least one force detection sensor 210.

An analysis module 420 analyzes a physical and time series combination of an electrical signal in respect of detection of at least one force detection sensor 210 through a force detection reception module 410.

In one embodiment, an analysis module 420 may analyze that force is applied to middle point of a corresponding plurality of force detection sensors in case of an electrical signal simultaneously received from a plurality of force detection sensors. For example, referring to FIG. 7, in case that a user applies force to a certain point 711, as a first detection sensor 710 and a second detection sensor 720 detects a force, an analysis module 420 may analyze that a point that the user applies force corresponds to a certain point 711 based on an electrical signal simultaneously received from a first detection sensor 710 and a second detection sensor 720. In case that a force applies to 712 point, a second detection sensor 720 and a third detection sensor 730 may detect a force and in case that a force applies to 713 point, a third detection sensor 730 and a fourth detection sensor 740 may detect a force. In case that a force applies to 714 point, a fourth detection sensor 740 and a first detection sensor 710 may detect a force.

For other example, an analysis module 420 may analyze that a point that a user applies force corresponds to a center 715 of a first housing 110 based on an electrical signal simultaneously received from a first detection sensor 710, a second detection sensor 720, a third detection sensor 730 and a fourth detection sensor 740.

In one embodiment, in case of an electrical signal gradually received from at least one detection sensor 210, an analysis module 420 may analyze time series combination in respect of a type of sensor detected a force, the number of reception of an electrical signal and a reception order of an electrical signal etc. Also, in case of an electrical signal simultaneously or gradually received from a plurality of detection sensors, an analysis module 420 may analyze a physical and time series combination in respect of an electrical signal received.

A mapping module 430 maps analysis result performed at an analysis module 420 onto a light emitting pattern in respect of at least one light emitter 320 or a control order in respect of a user's terminal. In one embodiment, a wearable apparatus 100 may associate a light emitting pattern or a control order in respect of each analysis result of an electrical signal to store and a mapping module 430 may map an electrical signal onto a control order or a light emitting pattern associated with an analysis result of an electrical signal. For example, a wearable apparatus 100 may associate with a light emitting patter and a control order in respect of each a force detection pattern corresponding to an electrical signal to store like this following table 1.

TABLE 1

| Force detection pattern | Control order | | Light emitting pattern |
|---|---|---|---|
| A first sensor | Over 2 sec | Perform user's terminal remote recording application | |
| A second sensor | Over 2 sec | Connect a call with pre-determined abbreviated calling | Output selected number to Green/White pattern |
| A third sensor | Shortly | Select a spark pattern | Output only selected number to Green/White pattern |
| A first, a second, a third and a fourth sensor | Over 5 sec | Transmit SOS text message, call SOS | Output smile pattern to Red/Blue |

In one embodiment, a mapping module 430 selected number and a control order in respect of a user's terminal connecting a call with pre-determined abbreviated calling based on an electrical signal detected force from a second sensor over 2 sec onto a light emitting pattern outputting Green/White color.

A control module 440 may output a light emitting pattern mapped through a mapping module 430 through at least one light emitter 320 or may make a user's terminal to be controlled based on a control order transmitted to the user's terminal through a communication module 450. Herein, a communication module 450 may enable a wearable apparatus 100 to perform data transmission and reception with a user's terminal executing a certain application.

In one embodiment, a control module 440 may output a light emitting pattern mapped through a mapping module 430 through at least one light emitter 320, for example, referring to FIG. 8, a control module 440 may output I love you pattern 810, tear pattern 820, heart beat pattern 930, kiss pattern 840 or I feel ashamed pattern 850 through at least one light emitter 320. Herein, a light emitting pattern outputting through at least one light emitter 320 may not be limited to one embodiment and may be variously modified.

In one embodiment, a control module 440 may gradually output a light emitting animation pattern mapped through a mapping module 430 through at least one light emitter 320. For example, a control module 440 may output various animation pattern through at least one light emitter 320 like the following table 2. An upper of a wearable apparatus 100 according to control of a control module 440 may be outputted I love you pattern 910, tear animation pattern 920 like FIG. 9. A wearable apparatus 100 may receive new animation from a user's terminal to store as the following explanation.

TABLE 2

| A type of animation pattern | Color | Operation method |
|---|---|---|
| I love you | Red, Orange | a. Be Green smile mark (No. 1, 11, 4, 5, 6, 7 and 8 LED) after then 0.5 sec off<br>b. Be on No. 6 to Green during 0.5 sec<br>c. Be on No.(5, 7)->(4, 8)->(3, 9)->(2, 10)->(1, 11) Red, in sequence, at intervals of 0.2 sec<br>d. After flickering two time during 0.5 sec 5, 7, 4, 8, 3, 9, 2, 10, 1, 11 and Red and then all off<br>e. Repeat a to d |
| tear, ΓΓ | Green | a. Be continuously on Red No. 1, 6 and 11<br>b. Be on Green NO. 2 and No. 10 during 0.2 sec, No. 3 and No. 9 during 0.2 sec<br>c. Be on Green No. 4 and No. 8 during 0.2 sec<br>d. Be off No. 2, 3, 4, 8, 9 and 10 during 0.5 sec<br>e. Repeat b to d |
| heart beat level 1~5 | Red | Level 1. Be all Red. Repeat adjustment of brightness in reverse order 3 steps at intervals of 1.2 sec<br>Level 2. Be all Red. Repeat adjustment of brightness in reverse order 3 steps at intervals of 1.0 sec<br>Level 3. Be all Red. Repeat adjustment of brightness in reverse order 3 steps at intervals of 0.8 sec<br>Level 4. Be all Red. Repeat adjustment of brightness in reverse order 3 steps at intervals of 0.6 sec<br>Level 5. Be all Red. Repeat adjustment of brightness in reverse order 3 steps at intervals of 0.4 sec |
| oops~ | Red | a. Be on Red No. 1 and No. 11 all during 1 sec<br>b. Be on Red No. 5 during 0.2 sec<br>c. Be on Red No. 2 during 0.5 sec<br>d. Be off No. 5 and No. 6 during 1 sec<br>e. Repeat b to d |
| Kiss | Red, Green | a. Be on Green No. 2 and No. 10<br>b. Flicker Red No. 6 at intervals of 0.5 sec |
| I miss you | Green | a. Be on Green No. 1 to No. 12 at the same time during 1 sec<br>b. Adjustment of brightness in 3 steps at intervals of 0.5 sec (the most bright -> bright -> the middle bright flicker)<br>c. Be on Red smile mark (No. 1, 11, 4, 5, 6, 7, and 8) during 1 sec<br>d. Repeat a to c |
| I bored, Play with me | Green | a. Be on No. 2 and No. 8 -> No. 3 and No. 9 -> No. 10 and No. 4 in sequence at intervals of 0.5 sec<br>b. Be all off during 0.2 sec<br>c. Be on No. 10 and No. 4 -> No. 3 and No. 9 -> No. 2 and No. 8 in sequence at intervals of 0.5 sec<br>d. Be all off during 0.2 sec<br>e. Repeat a to d 5 times |
| I'll be there soon | Red | a. Be on No. 1~No. 12 LED in sequence at intervals of 0.2 sec<br>b. Be all off during 0.5 sec<br>c. Repeat a to b 5 times |

TABLE 2-continued

| A type of animation pattern | Color | Operation method |
|---|---|---|
| It's making me crazy, You're driving me crazy | Red | a. Be on No. 12, 2, 4, 6, 8 and 10 during 1 sec then be off, be on No. 1, 3, 5, 7, 9 and 11 during 1 sec then be off<br>b. Be on No. 2, 4, 6, 8, 10 and 12 during 1 sec then be off, be on No. 3, 5, 7, 9, 11 and 1 during 1 sec then be off<br>c. Be on No. 4, 6, 8, 10, 12 and 2 during 1 sec then be off, be on No. 5, 7, 9, 11, 1 and 3 during 1 sec then be off<br>d. Be on No. 6, 8, 10, 12, 2 and 4 during 1 sec then be off, be on No. 7, 9, 11, 1, 3 and 5 during 1 sec then be off<br>e. Be on No. 8, 10, 12, 2, 4 and 6 during 1 sec then be off, be on No. 9, 11, 1, 3, 5 and 7 during 1 sec then be off<br>f. Be on No. 10, 12, 2, 4, 6 and 8 during 1 sec then be off, be on No. 11, 1, 3, 5, 7 and 9 during 1 sec then be off<br>g. Repeat a to f 6 times quickly at each time (1 sec -> 0.8 sec -> 0.6 sec -> 0.4 sec -> 0.2 sec -> 0.05 sec)<br>h. Repeat a to g |
| Smile, All right | Red | a. Be on Red No. 1, 11, 4, 5, 6, 7 and 8 during 2 sec<br>b. Be all off during 0.5 sec<br>c. Repeat a to b |
| LOL | Red, Orange | a. Be on Red No. 1, 11, 4, 5, 6, 7 and 8 during 2 sec<br>b. Flicker 3 times No. 4, 5, 6, 7 and 8 at intervals of 0.2<br>c. Repeat a to b 5 times |
| Let's go together | Red, Orange | a. Be on Red No. 9->10, 8->11, 7->12, 6->1, 5->2 and 4->3 in sequence at intervals of 0.2 sec<br>b. Be off Red No. 9->10, 8->11, 7->12, 6->1, 5->2 and 4->3 in sequence at intervals of 0.2 sec<br>c. Repeat a to b |
| tear, ㅜㅜ | Green | a. Be continuously on Red No. 1, 6 and 11<br>b. Be on Green NO. 2 and No. 10 during 0.2 sec, No. 3 and No. 9 during 0.2 sec<br>c. Be on Green No. 4 and No. 8 during 0.2 sec<br>d. Be off No. 2, 3, 4, 8, 9 and 10 during 0.5 sec<br>e. Repeat b to d |
| I feel depressed | Red | a. Be on Red No. 1, 6 and 11<br>b. Be off Red No. 1 and 11 during 0.5 sec<br>c. Be on Red No. 1 and 11 during 0.5 sec<br>d. Repeat b to c |
| I feel ashamed | Red, Green | a. Be on Green No. 1, 11, 5, 6 and 7<br>b. Flicker on Red No. 3 and 9 during 0.5<br>c. Repeat a to b |
| I feel depressed+, heart beat in half (Just so-so) | Red | Be on Red No. 1, 11 and 6 during 0.5 sec & Be off No. 1, 11 and 6 during 0.5 sec<br>Be on Red No. 1, 11 and 6 during 0.5 sec & Be off No. 1, 11 and 6 during 0.5 sec<br>Be on Red No. 1~12 all LEDs during 0.5 sec<br>Be off Red No. 1~12 all LEDs during 0.5 sec<br>Be on Red No. 1~12 all LEDs during 0.5 sec<br>Be off Red No. 1~12 all LEDs during 0.5 sec<br>Be on Red No. 1~12 all LEDs during 0.5 sec<br>Be off No. 12 during 0.05<br>Be off No. 1 during 0.05<br>Be off No. 2 during 0.05<br>Be off No. 3 during 0.05<br>Be off No. 4 during 0.05<br>Be off No. 5 during 0.05<br>Be off Red No. 6, 7, 8, 9, 10 and 11 during 0.5 sec & Be on No. 6, 7, 8, 9, 10 and 11 during 0.5 sec<br>Be off Red No. 6, 7, 8, 9, 10 and 11 during 0.5 sec & Be on No. 6, 7, 8, 9, 10 and 11 during 0.5 sec<br>Be off Red No. 6, 7, 8, 9, 10 and 11 during 0.5 sec & Be on No. 6, 7, 8, 9, 10 and 11 during 0.5 sec<br>Be off Red No. 6, 7, 8, 9, 10 and 11 during 0.5 sec<br>Be off all LEDs during 1 sec (waiting) |
| Smile+, relaxed mood (I feel comfortable) | Red | Be on No. 1, 11, 4, 5, 6, 7 and 8 during 0.5 sec & Be off No. 1, 11 and 6 during 0.5 sec<br>Be on No. 1, 11, 4, 5, 6, 7 and 8 during 0.5 sec & Be off No. 1, 11 and 6 during 0.5 sec<br>Be on Red No. 1~12 all LEDs during 0.5 sec<br>Be off Red No. 1~12 all LEDs during 0.5 sec |

TABLE 2-continued

| A type of animation pattern | Color | Operation method |
|---|---|---|
| | | Be on Red No. 1~12 all LEDs during 0.5 sec |
| | | Be off Red No. 1~12 all LEDs during 0.5 sec |
| | | Be on Red No. 1~12 all LEDs during 0.5 sec |
| | | Be off No. 12 during 1 sec |
| | | Be off No. 11 and No. 1 during 1 sec |
| | | Be off No. 10 and No. 2 during 1 sec |
| | | Be off No. 9 and No. 3 during 1 sec |
| | | Be off No. 8 and No. 4 during 1 sec |
| | | Be off No. 7 and No. 5 during 1 sec |
| | | Be off No. 11 and No. 1 during 1 sec |
| | | Be off No. 6 during 1 sec |
| | | Be off all LEDs during 1 sec (waiting) |
| running alone(hurriedly) | Red | Be on No. 12 during 0.1 sec & Be off No. 12 during 0.1 sec |
| | | Be on No. 1 during 0.1 sec & Be off No. 12 during 0.1 sec |
| | | Be on No. 2 during 0.1 sec & Be off No. 12 during 0.1 sec |
| | | Be on No. 3 during 0.1 sec & Be off No. 12 during 0.1 sec |
| | | Be on No. 4 during 0.1 sec & Be off No. 12 during 0.1 sec |
| | | Be on No. 5 during 0.1 sec & Be off No. 12 during 0.1 sec |
| | | Be on No. 6 during 0.1 sec & Be off No. 12 during 0.1 sec |
| | | Be on No. 7 during 0.1 sec & Be off No. 12 during 0.1 sec |
| | | Be on No. 8 during 0.1 sec & Be off No. 12 during 0.1 sec |
| | | Be on No. 9 during 0.1 sec & Be off No. 12 during 0.1 sec |
| | | Be on No. 10 during 0.1 sec & Be off No. 12 during 0.1 sec |
| | | Be on No. 11 during 0.1 sec & Be off No. 12 during 0.1 sec |
| Whether to go or not | Red | Be on No. 12 during 0.1 sec & Be off No. 12 during 0.1 sec |
| | | Be on No. 1 during 0.1 sec & Be off No. 12 during 0.1 sec |
| | | Be on No. 2 during 0.1 sec & Be off No. 12 during 0.1 sec |
| | | Be on No. 3 during 0.1 sec & Be off No. 12 during 0.1 sec |
| | | Be on No. 4 during 0.1 sec & Be off No. 12 during 0.1 sec |
| | | Be on No. 5 during 0.1 sec & Be off No. 12 during 0.1 sec |
| | | Be on No. 6 during 0.1 sec & Be off No. 12 during 0.1 sec |
| | | Be on No. 7 during 0.1 sec & Be off No. 12 during 0.1 sec |
| | | Be on No. 8 during 0.1 sec & Be off No. 12 during 0.1 sec |
| | | Be on No. 9 during 0.1 sec & Be off No. 12 during 0.1 sec |
| | | Be on No. 10 during 0.1 sec & Be off No. 12 during 0.1 sec |
| | | Be on No. 11 during 0.1 sec & Be off No. 12 during 0.1 sec |
| | | Be on No. 12 during 0.1 sec & Be off No. 12 during 0.1 sec |
| | | Be on No. 11 during 0.1 sec & Be off No. 12 during 0.1 sec |
| | | Be on No. 10 during 0.1 sec & Be off No. 12 during 0.1 sec |
| | | Be on No. 9 during 0.1 sec & Be off No. 12 during 0.1 sec |
| | | Be on No. 8 during 0.1 sec & Be off No. 12 during 0.1 sec |
| | | Be on No. 7 during 0.1 sec & Be off No. 12 during 0.1 sec |
| | | Be on No. 6 during 0.1 sec & Be off No. 12 during 0.1 sec |
| | | Be on No. 5 during 0.1 sec & Be off No. 12 during 0.1 sec |
| | | Be on No. 4 during 0.1 sec & Be off No. 12 during 0.1 sec |

TABLE 2-continued

| A type of animation pattern | Color | Operation method |
|---|---|---|
| | | Be on No. 3 during 0.1 sec & Be off No. 12 during 0.1 sec |
| | | Be on No. 2 during 0.1 sec & Be off No. 12 during 0.1 sec |
| | | Be on No. 1 during 0.1 sec & Be off No. 12 during 0.1 sec |
| I'll hug | Red | Be on No. 2 & waiting during 0.1 sec |
| | | Be on No. 3 & waiting during 0.25 sec |
| | | Be on No. 4 & waiting during 0.25 sec |
| | | Be on No. 5 & waiting during 0.25 sec |
| | | Be on No. 6 & waiting during 0.25 sec |
| | | Be on No. 7 & waiting during 0.25 sec |
| | | Be on No. 8 & waiting during 0.25 sec |
| | | Be on No. 9 & waiting during 0.25 sec |
| | | Be on No. 10 & waiting during 0.25 sec |
| | | Be off No. 2 & Be on No. 11 & waiting during 0.1 sec |
| | | Be off No. 3 & Be on No. 12 & waiting during 0.1 sec |
| | | Be off No. 4 & Be on No. 1 & waiting during 0.1 sec |
| | | Be off No. 5 & Be on No. 2 & waiting during 0.1 sec |
| | | Be off No. 6 & Be on No. 3 & waiting during 0.1 sec |
| | | Be off No. 7 & Be on No. 4 & waiting during 0.1 sec |
| | | Be off No. 8 & Be on No. 5 & waiting during 0.1 sec |
| | | Be off No. 9 & Be on No. 6 & waiting during 0.1 sec |
| | | Be off No. 10 & Be on No. 7 & waiting during 0.1 sec |
| | | Be off No. 11 & Be on No. 8 & waiting during 0.1 sec |
| | | Be off No. 12 & Be on No. 9 & waiting during 0.1 sec |
| | | Be off No. 1 & Be on No. 10 & waiting during 0.1 sec |
| | | Be off No. 10 & waiting during 0.1 sec |
| | | Be off No. 9 & waiting during 0.1 sec |
| | | Be on No. 3, 4, 5, 6, 7, 8, 9, 10 and 11 during 0.1 sec |
| | | Be off No. 3 during 0.1 sec |
| | | Be on No. 4, 5, 6, 7, 8, 9, 10 and 12 during 0.1 sec |
| | | Be off No. 1~12 all during 0.1 sec |
| | | Be on No. 5, 6, 7, 8, 9, 10, 11, 12 and 1 during 0.1 sec |
| | | Be off No. 1~12 all during 0.1 sec |
| | | Be on No. 6, 7, 8, 9, 10, 11, 12, 1 and 2 during 0.1 sec |
| | | Be off No. 1~12 all during 0.1 sec |
| | | Be on No. 7, 8, 9, 10, 11, 12, 1, 2 and 3 during 0.1 sec |
| | | Be off No. 1~12 all during 0.1 sec |
| | | Be on No. 8, 9, 10, 11, 12, 1, 2, 3 and 4 during 0.1 sec |
| | | Be off No. 1~12 all during 0.1 sec |
| | | Be on No. 9, 10, 11, 12, 1, 2, 3, 4 and 5 during 0.1 sec |
| | | Be off No. 1~12 all during 0.1 sec |
| | | Be on No. 10, 11, 12, 1, 2, 3, 4, 5 and 6 during 0.1 sec |
| | | Be off No. 1~12 all during 0.1 sec |
| | | Be on No. 11, 12, 1, 2, 3, 4, 5, 6 and 7 during 0.1 sec |
| | | Be off No. 1~12 all during 0.1 sec |
| | | Be on No. 12, 1, 2, 3, 4, 5, 6, 7 and 8 during 0.1 sec |
| | | Be off No. 1~12 all during 0.1 sec |
| | | Be on No. 1, 2, 3, 4, 5, 6, 7, 8 and 9 during 0.1 sec |
| | | Be off No. 1~12 all during 0.1 sec |
| Be a great success, Best, Excellent (smile from ear to ear) | Red | a. Be on No. 1, 11, 3, 4, 5, 6, 7, 8 and 9 |
| | | b. Be off No. 3, 4, 5, 6, 7, 8 and 9 during 0.05 sec |
| | | c. Be on No. 3, 4, 5, 6, 7, 8 and 9 during 0.05 sec |
| | | d. Repeat b to c |

TABLE 2-continued

| A type of animation pattern | Color | Operation method |
|---|---|---|
| It's warm | Red | Depressed -> Smile -> Be a great success |
| I'm sorry (Blink one's eyes) | Red | a. Be on No. 1, 11 and 6 |
|  |  | b. Be off No. 1 and No. 11 during 0.5 sec |
|  |  | c. Be on No. 1 and No. 11 during 0.5 sec |
|  |  | d. Repeat b to c |

In one embodiment, a control module 440 may make a light emitting pattern emitted through at least one light emitter 320 equally output to a user's terminal as well.

In one embodiment, referring to [table 1], in case that a control order corresponding to SOS text message transmission through a mapping module 430 is mapped, a control module 440 may transmit SOS text message transmission control order to a user's terminal through a communication module 450 and may enable a user's terminal to transmit SOS text message and to call an emergency call to pre-determined phone number at the same time.

In one embodiment, in case that detection through at least one force detection sensor 210 isn't during certain time, a control module 440 may discontinue or terminate the work of application performed at a user's terminal and may terminate an output of a light emitting pattern outputted through at least one light emitter 320.

In one embodiment, a control module 440 may be set one among flickering condition of at least one light emitter 320, flickering method, the number of flickering and a type of color through a user's terminal. Herein, a flicking method may include one among flickering order of respective at least one light emitter 320, flickering time and adjustment of brightness.

In one embodiment, a control module 440 may set a wearable apparatus 100 on a certain mode based on an electrical signal received through a force detection reception module 410. In one embodiment, a wearable apparatus 100 may be set on a watch mode, a game mode or a health mode, for example, in case that a wearable apparatus simultaneously receives an electrical signal corresponding to one time from a first sensor, a second sensor, a third sensor and a fourth sensor through a force detection reception module 410, may set a wearable apparatus 100 on a health mode. In one embodiment, a wearable apparatus 100 may associate with a certain mode in respect of each electrical signal to manage.

In one embodiment, a watch mode may not perform other word through a wearable apparatus 100, may correspond to a mode displaying current watch through at least one light emitter 320 and a game mode may correspond to a mode performing game through a user's terminal, a health mode may correspond to a mode performing a healthcare of user through at least one sensor associated in a wearable apparatus.

In one embodiment, a detection pattern detected through at least one force detection sensor 210 of a wearable apparatus 100 may be altered according to a type of certain set mode. For example, in case that a wearable apparatus 100 is on a watch mode, a signal shortly inputted through a force detection sensor 210 may not receive, for example, in case that a wearable apparatus 100 transmits from a watch mode to other mode, may alter mode through a signal inputted over 0.5 sec. For other example, in case that a wearable apparatus 100 is on a game mode, a signal inputted through a force detection sensor 210 in a time length of 0.5 sec. That is, in case of a game mode, only shortly inputted signal corresponding to direction conversion of game.

A control module 440 controls at least on light emitter 320 through being controlled certain application of a user's terminal. In one embodiment, a control module 440 may control at least one light emitter 320 according to a type of application executing user's terminal, a type of work executing application or whether an application is normally executed. For example, in case that a certain application of user's terminal normally operates, a control module 440 may output pre-determined certain light emitting pattern through at least one light emitter 320.

As the following, a function and operation performing at a wearable apparatus 100 will be described with specific example. The following embodiments are an embodiment example and other function and operations may be embodied in corresponding wearable apparatus 100.

The following [table 3] describes examples of a function coped with corresponding force detection pattern on a certain operation mode and force detection pattern corresponding to an electrical signal outputted from each detection sensor.

TABLE 3

| Force detection pattern | | Operation point (operation mode) | function |
|---|---|---|---|
| Up | Longer (Toggle) | Default mode (watch mode) | Recording remote control |
|  | shortly | a camera application is driven | Self-camera remote control |
|  | Shortly | a phone rings | Transmission vibration/bell |
|  | Shortly | Listening to music (listen to music mode) | Volume up |
|  | Shortly | Game mode | Transmission direction ↑ |
| Down | Shortly | Call an abbreviated calling | choose an abbreviated calling |
|  | Longer | Default mode (watch mode) | Call an abbreviated calling |
|  | Shortly | Listening to music (listen to music mode) | Volume down |
|  | Shortly | Game mode | Transmission direction ↓ |

TABLE 3-continued

| Force detection pattern | | Operation point (operation mode) | function |
|---|---|---|---|
| Left | Shortly | Select a spark pattern | choose a spark pattern |
| | Longer | Default mode (watch mode) | Select a spark pattern |
| | Shortly | Game mode | Transmission direction ← |
| Right | Shortly | Select a game mode | Choose a game |
| | Longer | Default mode (watch mode) | Select a game |
| | Shortly | Transmit a damagojji game signal | Feed to damagojji |
| | Shortly | Game mode | Transmission direction → |
| Up + down + left + right | Shortly | Default mode (watch mode) | I'm here, I'm OK |
| | Over 5 sec | Emergency situation | This's an emergenct, Help me |
| | Shortly | Game mode | Select a game |
| | Shortly | Health mode | Operation one time OK |
| Up + right | Longer | Default mode (watch mode) | Power Off/Reset (or, cancel Bluetooth) |

Press shortly: when the button is pressed less 2 sec
Press longer: when the button is pressed over 2 sec A function corresponding to force detection pattern may be different according to current operation mode of a wearable apparatus 100 like as the table 3.

The following [table 4] describes examples of a light emitting pattern in order to display a function executing in a wearable apparatus 100.

TABLE 4

| | Light emitting pattern | | |
|---|---|---|---|
| Function | Operation method | Number of operating | Cycle of flickering |
| Power ON | No. 1~No. 12, gradually lighting by color then OFF | | 0.2 sec |
| Watch | Fix hour hand, flicker minute hand | | 0.5 sec |
| Receive text message | Be Red No. 6 | | 0.2 sec |
| Unanswered call | Be Red No. 12 | | 0.2 sec |
| "I'm here, I'm OK" | Smile in Green/White (1, 4, 5, 6, 7, 8,11) | One time | 0.5 sec |
| "emergency, SOS" | Smile in Red/Blue | Two time | 0.5 sec |
| Select a game | Be ON only selected number in Green/White When a game is determined, smile in Green/white | One time | 0.5 sec |
| Select a spark | Be ON only selected number in Green/White | One time | 0.5 sec |
| Select an abbreviated calling | Be ON only selected number in Green/White | One time | 0.5 sec |
| Health operation one time OK | Be ON No. 3, 6, 9, 12 (4) in Red/Blue | One time | 0.5 sec |
| Check pressing a button | When confirmation pressing is operated, smile in Green (No. 1, 11, 4, 5, 6, 7, 8 LED) | Two time | 0.5 sec |
| Text message/call reception notification | Text message notification (kakao talk): Flicker No. 6 LED in yellow | | 0.2 sec |
| | Unanswered call notification: Flicker No. 12 LED in Red (selecting notification function use or not on application of user's terminal (it may be used only a watch mode) If a text message or call is checked on cell phone, canceling notification and display a watch If any key is pressed on a notification display mode, canceling notification and display a watch) | | 0.5 sec |

A wearable apparatus 100 may display a function currently being executed through a light emitting pattern like as the table 4.

The following [table 5] describes examples of a function that a wearable apparatus 100 control an operation of user's terminal. A wearable apparatus 100 may transmit a control order corresponding to a force detection pattern to user's terminal to control an operation of user's terminal.

TABLE 5

| Control operation | Force detection pattern | Control volume and order of priority |
|---|---|---|
| a camera application is driven -> self-camera photographing button | Press up (a second detection sensor) | Self-carema |
| A call rings -> auto-transmission vibration/bell (Toggle) | Press up (a second detection sensor) | Transmission vibration/bell |
| Remote control recording | Press longer up (a second detection sensor) | recording |
| Remote music volume control | Press up/down (a second detection sensor/a fourth detection sensor) | |

The following [table 6] describes examples of other function (abbreviated calling function) that a wearable apparatus 100 control an operation of user's terminal. A wearable apparatus 100 may transmit a control order corresponding to a force detection pattern to user's terminal to control call operation and an abbreviated calling selection of user's terminal.

TABLE 6

| Control operation | Operation explanation | Force detection pattern |
|---|---|---|
| Choose | Every time "shortly pressing" "down" one time, be gradually ON from No. 1 to No. 12 in Red LED at time location from one o'clock to twelve o'clock | Press shortly down |
| Select | In situation selected corresponding number, if "press longer" of "down" performs again, a dial phone to phone number stored in corresponding number In situation be not selected corresponding number, if "press longer" of "down" performs again, a dial phone unconditionally to phone number stored in number one (Default) | Press longer down |
| cancel | In situation selected corresponding number, if "down" isn't pressed again during 10 sec or other direction is pressed, cancel an abbreviated calling function | |

Set an abbreviated calling of 12 people (or use an abbreviated calling storage number of user's terminal)

The following [table 7] describes examples of other function (emergency situation notification function) that a wearable apparatus 100 control an operation of user's terminal. A wearable apparatus 100 may transmit a control order corresponding to a force detection pattern to user's terminal to control user's terminal to transmit a text message to other user's terminal or to control to be made a call to user's terminal.

TABLE 7

| | Operation explanation | Force detection pattern |
|---|---|---|
| Ordinary day | User's terminal transmits "text message"(I'm here or I'm doing nicely) and location information to pre-determined phone number 1. Set maximum 3 people (identical to emergency situation) 2. After transmitting operation, display confirmation of transmission completion (flicker Green smile one time) | Press the center (or 4 of up, down, left, right) less 6 sec Or, press the center at regular intervals several times ("clenching one's fist") |
| Emergency situation | Transmit "Calling, emergency situation text message animation ("danger! Help me")picture, location information and parent's phone number" to pre-determined phone number and automatically make a call simultaneously 1. Set maximum 3 people (last number is set 119) 2. After transmitting operation, display confirmation of transmission completion (flicker Green smile two times) | Press the center (or 4 of up, down, left, right) over 5 sec Or, press the center at regular intervals several times ("clenching one's fist") |

The following [table 8] describes examples of a game function of a wearable apparatus 100. A wearable apparatus 100 enters a game mode according to control order corresponding to a force detection pattern. In the game mode, a wearable apparatus 100 may perform an operation corresponding to a mode such as selecting game, performing game and canceling game mode.

TABLE 8

| Control operation | Operation explanation | Force detection pattern |
|---|---|---|
| choose game | Every time "shortly press" "right" one time, be gradually ON from No. 1 to No. 12 to time location of one o'clock to twelve o'clock in Red LED | Press shortly right |
| Select game | When pressing longer "right" in respect of selected game is executed, | Press longer right |
| Cancel game mode 1 | When "right" longer pressing is executed again in the game mode ON | Press longer right |
| Cancel game mode 2 | When "right" isn't pressed during 10 sec or different direction is pressed in the game choosing mode | |

1. When a notification message (hungry, play with me . . . etc.) is come in the game, cancel through press "right" selection
2. After executing a game, up, down, left, right direction operate on determined setting (mostly direction key) in each game
3. When the center (being pressed simultaneously 4 directions) of a wearable apparatus is pressed, notify confirmation button The following [table 9] describes examples of a spark pattern output function of a wearable apparatus 100. A wearable apparatus 100 enters a spark pattern mode according to a control order corresponding to a force detection pattern. In a spark pattern mode, a wearable apparatus 100 may perform an operation associated with corresponding mode such as selecting a spark pattern, canceling a spark pattern mode and transmitting a mode.

TABLE 9

| Control operation | Operation explanation | Force detection pattern |
|---|---|---|
| Choose spark pattern | Every time press shortly "left" one time, output gradually stored spark pattern. Output time of each spark pattern is 10 sec | Press shortly left |
| Select spark pattern | When pressing longer "left" in respect of selected spark pattern again, output corresponding light pattern (moving pattern) | Press longer left |
| Cancel spark pattern mode | When "left" isn't pressed during 10 sec or other direction is pressed in spark pattern choosing mode | |
| Transmit default mode | When any direction is shortly pressed in the situation of being outputted spark pattern, spark pattern isn't outputted and transmit to default mode (watch mode) | |

1. When "press longer" of "left" is detected during counting the number of "press shortly" of "left", output spark pattern of corresponding number to counting number
2. Embedding programmed source basic 12 spark patterns (when "left" is pressed in case that pairing isn't done to user's terminal, select among embedded 12 spark patterns and output. After pairing to user's terminal, select intended spark pattern received from user's terminal and output)

The following [table 10] describes examples of a health mode function of a wearable apparatus 100. A wearable apparatus 100 enters a health mode according to a control order corresponding to a force detection pattern. In a health mode, a wearable apparatus 100 may perform an operation associated with corresponding mode such as helping exercise, canceling a health mode.

TABLE 10

| Control operation | Operation explanation | Force detection pattern |
|---|---|---|
| Transmit health mode | Transmit to health mode | Pre-determined pattern |
| Help exercise | Count the number of pressing simultaneously up, down, left, right all directions over 0.5 sec to output number and consumed calorie (every time being exactly pressed, flicker LED to notify that exact exercise operation is done) | |
| Cancel health mode | When any direction isn't pressed over 30 sec, cancel a health mode | |

A wearable apparatus 100 may transmit or receive a user's terminal and date through a wireless communication. For example, a wearable apparatus 100 may transmit or receive a user's terminal and date through a wireless communication such as bluetooth. A user's terminal may control an operation of a wearable apparatus 100 through pre-determined wearable apparatus control application or may transmit date through a wearable apparatus 100. A wearable apparatus 100 also may transmit date to a user's terminal through corresponding application or may control an operation of a user's terminal. A user's terminal may perform corresponding application according to a control of a user and corresponding application may exchange a wearable apparatus 100 and date (for example, condition information, control information, setting information etc.) through a wireless communication module.

FIG. 10 is a draw illustrating a screen of an application controlling a wearable apparatus in user's terminal.

Referring to FIG. 10, a wearable apparatus control application may display current condition of a wearable apparatus 100. Also, corresponding application may input setting information according to a control of a user to set a condition of a wearable apparatus 100.

FIG. 11 is a draw illustrating a screen setting watch condition and a screen purchasing a light emitting pattern in an application in FIG. 10.

In case of entering a light emitting pattern purchase mode in an application screen of FIG. 10, an application may access a light emitting pattern purchase server according to a control of a user to purchase a light emitting pattern.

Also, in case of entering from an application screen of FIG. 10 to a fashion mode, an application may set decoration condition such as a color of watch, a shape of watch according to a control of a user or may select a light emitting pattern that will be outputted from a wearable apparatus 100. For example, in case of entering to a watch color alteration mode, an application may alter a color of watch according to a control of a user.

FIG. 12 is a draw illustrating a screen storing a generated light emitting pattern and a screen generating new light emitting pattern in an application in FIG. 10.

In case of entering from an application screen of FIG. 10 to new light emitting pattern generation mode, an application may generate new light emitting pattern or animation pattern according to a control of a user. An application may transmit generated light emitting pattern or animation pattern to a wearable apparatus 100. Or, an application may transmit generated light emitting pattern or animation pattern to a light emitting purchase server to provide for other users.

FIG. 13 is a draw illustrating a screen setting transmission function a message as usual and a screen setting a function of a wearable apparatus in an application in FIG. 10.

In case of entering from an application screen of FIG. 10 to setting mode, an application may set condition of a wearable apparatus 100 according to a control of a user and may transmit setting information to a wearable apparatus 100. For example, an application may set condition of a wearable apparatus 100 such as a receiver receiving "I'm here" message, a receiver receiving "emergency situation (SOS)" message, a receiver corresponding to a number of "abbreviated calling", notification message function On/Off, loss/missing child function On/Off and setting a color of watch.

In case of entering from setting mode screen of FIG. 13 to usual message receiver, an application may set a receiver number and content of usual message ("I'm here", "I'm OK") according to a control of a user.

FIG. 14 is a draw illustrating a screen setting number of an abbreviated calling and a screen setting an emergency situation transmission function in an application in FIG. 10.

In case of entering from setting mode screen of FIG. 13 to setting mode an emergency situation message receiver, an application may set a receiver's number and content of an emergency situation message ("SOS", "Help me") according to a control of a user In case of entering from setting mode screen of FIG. 13 to a mode setting an abbreviated calling receiver, an application may set receiver's phone number corresponding to an abbreviated calling according to a control of a user.

FIG. 15 is a draw illustrating a result screen performing a health mode and a screen setting a game in an application in FIG. 10.

In case of entering from an application screen of FIG. 10 to game setting mode, an application may set a game that will be performed according to a control of a user. Also, in case of entering from an application screen of FIG. 10 to a health mode, an application may provide a result that a user performs exercise through a health mode.

FIG. 5 is a flow chart for a wearable apparatus control method performed through a wearable apparatus.

A force detection reception module 410 of a control unit receives an electrical signal in respect of a force applied to a certain point of a first housing 100 detected through at least one force detection sensor 210 (step S501).

An analysis module 420 of a control unit analyzes an electrical signal received through a force detection reception module 410 (step S502). In one embodiment, an analysis module 420 may analyze a physical or a time series combination of received electrical signal.

A mapping module 430 of a control unit maps analyzed result onto a light emitting pattern or a control order through an analysis module 420 (step S503).

A control module 440 of a control unit outputs mapped light emitting pattern through at least one light emitter 320 or provides mapped control order to a user's terminal to perform a control order by a user's terminal (step S504). In one embodiment, a control unit may provide a control order to a user's terminal through a communication module 450.

The above a control method of a wearable apparatus 100 will be described with specific example as follows.

FIG. 16 to FIG. 23 is a flow chart for a control method of a wearable apparatus.

Referring to FIG. 16, when a wearable apparatus 100 is operated by a control of a user (step S1601), a control unit outputs light emitting pattern set up default through at least one light emitter 320 (step S1603).

A control unit checks whether a user's terminal is connected with a wireless communication (for example, bluetooth) through a communication module 450 (step S1605). If a user's terminal isn't connected, a control unit checks whether left direction (or, certain direction) of a wearable apparatus 100 (step S1607).

As mentioned above, in case that a force applies to certain direction of a wearable apparatus 100 (for example, in case of being pressed), a force detection sensor 210 of corresponding point outputs an electrical signal in respect of force and an analysis module 420 analyzes a physical or a time series combination of corresponding electrical signal. A mapping module 430 of a control unit maps a result analyzed from an analysis module 420 onto a light emitting pattern or a control order, a control module 440 of a control unit controls in order to perform a control order mapped at an analysis mapping module 430 or outputs a mapped light emitting pattern. For convenience explanation in the following, when a certain direction is pressed, (or, when a certain button is pressed (force detection sensor)), an explanation in respect of specific process performed at a control unit as mentioned above is skipped.

In case of being pressed left direction (or, certain direction) in the step S1607, a control unit alters a light emitting pattern to animation pattern through the following ⑧ process to output (step S1609). Therefore, a wearable apparatus 100 may select one among embedded animation pattern to output even the case of not being connected with a user's terminal.

After altering light emitting pattern to selected animation pattern, a control unit returns "A" condition. In the step S1607, a control unit returns "A" condition even the case of not being pressed left direction.

In the step S1605, in case of connecting a user's terminal through a wireless communication, a control unit checks whether the button of a wearable apparatus 100 presses (step S1611), the following ① process performs in case of being pressed the button.

In the step S1611, in case of not being pressed the button, a control unit checks whether a signal receives from a user's terminal (step S1613). When a signal isn't received from a user's terminal and the button isn't pressed during certain time (for example, 30 sec), a control unit cancels current mode such as game mode, health mode (step S1611).

In the step S1613, in case of receiving a signal from a user's terminal, a control unit checks whether a received signal is a signal that transmits a mode. In case that a received signal is watch mode transmission signal (step S1617), a control unit sets current mode to watch mode and outputs watch animation through at least one light emitter 320 (step S1619).

In case that a received signal is a game mode transmission signal (step S1621), a control unit sets current mode to game mode (step S1623), in case of health mode transmission signal (step S1625), a control unit sets current mode to fashion mode and outputs animation pattern received from a user's terminal (step S1631).

FIG. 17 is a flow chart for process performed ① process in a wearable apparatus.

Referring to FIG. 17, in case of being pressed the button in step S1611, a control unit checks current mode and performs a control order according to current mode.

For example, in case that current mode is a game mode (step S1701), a control unit recognizes a signal of pressed direction button as a control order of game to perform ② process (step S1703). That is, a control unit may appreciate each signal of direction as a control order of game to control game. In one embodiment, each direction signal may alter a control order corresponding to a direction key setting function of corresponding game.

In case that a current mode isn't a game mode, a control unit checks whether it is a health mode or not (step S1705). In case that current mode is a health mode, a control unit performs exercise aid movement (step S1707). For example, a control unit counts the number simultaneously pressed up, down, left, right 4 directions over certain time (for example, 0.5 sec) to output numbers and expectation consumed calorie. A control unit flickers LED of corresponding point every time 4 directions are simultaneously pressed to notify to user that accurate operation is being done.

In case that current mode isn't health mode, a control unit checks whether it is a fashion mode or not (step S1709). In case that current mode is fashion mode, a control unit cancels fashion mode and transmits watch mode (step S1711). For example, a control unit may cancel a fashion mode and output watch animation.

In case that current mode isn't a fashion mode, a control unit checks whether up, down, left, right 4 directions are simultaneously pressed (step S1713) to perform ③ process in case of not being pressed simultaneously.

In the step S1713, in case that up, down, left, right 4 directions are simultaneously pressed, a control unit checks whether pressing is continued over 5 sec (step S1715). In case of not being pressed over 5 sec, a control unit transmits usual message ("I'm here" or "I'm doing nicely") and location information to pre-determined phone number and outputs animation corresponding to transmission completion confirmation mark (step S1717).

In the step 1715, in case of being pressed over 5 sec, a control unit transmits one among an emergency situation message, picture, location information and parent's phone number to pre-determined phone number (emergency situation mode) (step S1719). After transmitting completion, a control unit outputs animation corresponding to transmission completion confirmation mark. In one embodiment, in case that several receiver phone numbers are set, a control unit may gradually make a call from a first number.

After performing step S1703, S1707, S1711, S1717 and S1719, a control unit returns "A" condition.

FIG. 18 is a flow chart for process performed ② process in a wearable apparatus, FIG. 19 is a flow chart for process performed ④ process in a wearable apparatus.

Referring to FIG. 18 to FIG. 19, a control unit may combine inputted direction signal to perform a control order matched with an analyzed result. For example, a control unit may combine simultaneously or time sequential inputted direction signal to perform a control order (Action A, Action B, Action C, Action D and Action E) in a game.

FIG. 20 is a flow chart for process performed ③ process in a wearable apparatus.

Referring to FIG. 20, in step S2013, in case that up, down, left, right 4 directions aren't simultaneously pressed, a control unit checks whether up direction is pressed (step S2001). In case of not being pressed up direction, a control unit performs ⑦ process.

In up direction is pressed, a control unit generates a control order controlling a user's terminal to transmit to a user's terminal (user's terminal control mode)

For example, in case that a user's terminal is on telephone reception condition (step S2003), a control unit transmit a bell transmission (vibration or bell) order to a user's terminal (step S2005).

In case that a user's terminal isn't on telephone reception condition, a control unit checks whether a user's terminal is on self-camera application operating condition (step S2007). In case of self-camera application operating condition, a control unit transmits self-camera shooting order to a user's terminal (step S2009).

In case that a user's terminal isn't on music application operating condition, a control unit checks whether up direction is pressed over certain time (for example, 2 sec) (step S2015). In case of being pressed over certain time, a control unit transmits a recording execution order to a user's terminal (step S2017).

In the step S2015, in case of not being pressed up direction over certain time or performing step S2005, S2009, S2013 and S2017, a control unit cancel current mode such as a game mode, an abbreviated calling selection mode, a light emitting pattern mode (step S2019). After canceling mode, a control returns "A" condition.

FIG. 21 is a flow chart for process performing ⑦ process in a wearable apparatus.

Referring to FIG. 21, in case that up direction isn't pressed in the step S2001, a control unit checks whether down direction is pressed (step S2101). In case of not being pressed down direction, a control unit performs ⑧ process.

In case of being pressed down direction, a control unit selects an abbreviated calling to generate order making a call and transmits to a user's terminal (abbreviated calling selection mode)

For example, in case of being pressed down direction, a control unit checks whether a user's terminal is on music application operating condition (step S2103). In case of not being on music application operating condition, a control unit counts the number of pressing down direction to select an abbreviated calling (step S2105).

For example, in case of being pressed down direction n times, a control unit selects an abbreviated calling No. n, flickers LED of direction of n o'clock to notify a user that corresponding abbreviated calling is selected.

In the corresponding condition, in case of being pressed down direction over certain time (for example, 2 sec) (step S2107), a control unit transmits order making a call of selected abbreviated calling to user's terminal and cancels an abbreviated calling selection mode (step S2109). A user's terminal received corresponding order may make a call of selected abbreviated calling.

In the step S2107, in case of not being pressed down direction over certain time (for example, 2 sec), a control unit cancels current mode such as a game mode, a light emitting pattern selection mode (step S2113).

In the step S2103, in case that a user's terminal is on music application operating condition, a control unit generates volume down order to transmit to a user's terminal (step S2111). After generating volume down order to transmit to a user's terminal, a control unit cancels current mode such as a game mode, a light emitting pattern selection mode (step S2113). After canceling a mode, a control unit returns "A" condition.

FIG. 22 is a flow chart for process performing ⑧ process in a wearable apparatus.

Referring to FIG. 22, in the step S2101, in case of not being pressed down direction, a control unit checks whether left direction is pressed (step S2201). In case of not being pressed left direction, a control unit performs ⑨ process.

In the left direction is pressed, a control unit may select animation pattern and output selected animation pattern (light emitting selection mode).

For example, in case of left direction is pressed, a control unit counts the number of pressing left direction to select a light emitting pattern (step S2203). For example, when the left direction is pressed n times, a control unit selects No. n among embedded animation pattern and outputs selected animation pattern.

In corresponding condition, in case of being pressed left direction over certain time (for example, 2 sec) (step S2205), a control unit sets current mode to fashion mode that decorates a wearable apparatus 100 (step S2207) and alters animation pattern (that is, selected animation pattern) being currently outputted to a light emitting pattern (step S2209). After altering a light emitting pattern, a control unit cancels current mode such as a game mode, a light emitting pattern selection mode (step S2211).

In the step S2205, in case of not being pressed left direction over certain time (for example, 2 sec), a control unit cancels current mode such as a game mode, a light emitting pattern selection mode (step S2211). After canceling a mode, a control unit returns "A" condition.

FIG. 23 is a flow chart for process performing ⑨ process in a wearable apparatus.

Referring to FIG. 23, in the step S2201, in case of not being pressed left direction, a control unit sets current mode to a game mode to select a game (step S2301). For example, a control unit counts the number of pressing right direction to select a game. For example, when right direction is pressed n times, a control unit selects No. n among games, flickers LED of direction of n o'clock to notify a user that corresponding game is selected.

In the corresponding condition, in case of being pressed right direction over certain time (for example, 2 sec) (step S2303), a control unit performs selected game (step S2305) and cancels current mode such as a light emitting pattern selection mode, an abbreviated calling selection mode (step S2307).

In the step S2303, in case of not being pressed right direction over certain time (for example, 2 sec), a control unit cancels current mode such as a light emitting pattern mode, an abbreviated calling selection mode (step S2307). After canceling a mode, a control unit returns "A" condition.

While the disclosure has been described in terms of exemplary embodiments, those skilled in the art will recognize that the disclosure can be practiced with modifications in the spirit and scope of the appended claims.

100: wearable apparatus
110: first housing
120: second housing
210: force detection sensor
220: force detection sensor
230: separation distance
310: control board
320: light emitter
330: light guide
410: force detection reception module
420: analysis module
430: mapping module
440: control module
450: communication module

The invention claimed is:

1. A wearable device apparatus, comprising:
a first and second housings configured to be connected with each other;
a plurality of light emitters configured to be separately located and configured to emit a light through the first housing;
a light guide configured to guide the light emitted from the plurality of light emitters;
a plurality of force detection sensors configured to be located in the first and second housings to detect a force applied to a certain point of the first housing; and
a control board including a control unit configured to control the plurality of light emitters through detection of the plurality of force detection sensors,
wherein the first and second housings are separately located at edges to form a floating distance through a separation distance and the separation distance temporarily reduces through the force applied to the certain point of the first housing,
the control unit analyzes a physical and time series combination in respect of detection of the plurality of force detection sensors, and
the control unit maps analysis result in respect of the detection onto one of a light emitting pattern in respect of the plurality of light emitters and a control order in respect of a user's terminal.

2. The wearable device apparatus of claim 1, wherein the control board locates 12 or 24 light emitters at one side and controls the plurality of light emitters according to a pattern detected through the plurality of force detection sensors.

3. The wearable device apparatus of claim 2, wherein the plurality of light emitters are disposed in one circle figuration when the number of the light emitters are 12 and the light emitters is disposed in double circles figuration (another circle in one circle) when the light emitters are 24.

4. The wearable device apparatus of claim 1, wherein the light guide guides the light of the light emitters to be outputted in a plurality of separated arcs and to be outputted in a message such as a text, an animation or a user's emotion by outputting a certain pattern.

5. The wearable device apparatus of claim 1, wherein the plurality of force detection sensors are located between the first and the second housing not to be exposed outwards.

6. The wearable device apparatus of claim 5, wherein the plurality of force detection sensors are located in 4 directions and a center based on the center of the first housing on the control board.

7. The wearable device apparatus of claim 5, wherein the 4 directions are up, down, left and right directions.

8. The wearable device apparatus of claim 1, wherein the control unit sets the wearable device with a certain mode according to the pattern detected through the plurality of force detection sensors.

9. The wearable device apparatus of claim 1, wherein the control unit performs transmission and reception of data with user's terminal that is able to execute a certain application.

10. The wearable device apparatus of claim 1, wherein the control unit outputs the mapped light emitting pattern through the plurality of light emitters.

11. A wearable device apparatus, comprising:
a first and second housings configured to be connected with each other;
a plurality of light emitters configured to be separately located and configured to emit a light through the first housing;
a light guide configured to guide the light emitted from the plurality of light emitters;
a plurality of force detection sensors configured to be located in the first and second housings to detect a force applied to a certain point of the first housing; and
a control board including a control unit configured to control the plurality of light emitters through detection of the plurality of force detection sensors,
wherein the first and second housings are separately located at edges to form a floating distance through a separation distance and the separation distance temporarily reduces through the force applied to the certain point of the first housing,
the control unit performs transmission and reception of data with user's terminal that is able to execute a certain application, and
wherein the control unit makes light pattern emitted through the plurality of light emitters identically output to the user's terminal.

12. A wearable apparatus control method of the wearable apparatus including: a first and second housings configured to be connected with each other; a plurality of light emitters configured to be separately located and configured to emit a light through the first housing; a light guide configured to guide the light emitted from the plurality of light emitters; a plurality of force detection sensors configured to be located in the first and second housings to detect a force applied to a certain point of the first housing; and a control board including a control unit configured to control the plurality of light emitters through detection of the plurality of force detection sensors, the wearable apparatus control method comprising:
(a) an outputting default light emitting pattern by the control unit when the wearable apparatus operates;
(b) a checking whether the control unit connects with a user's terminal through a wireless communication; and
(c) a selecting one among light patterns associated with the wearable apparatus in accordance with a user's control by the control unit to output the selected light pattern when the control unit doesn't connect with the user's terminal.

13. The wearable apparatus control method of claim 12, wherein the (c) includes a checking whether the control unit receives a signal from certain force detection sensor; and a counting the signal received from the certain force detection sensor by the control unit to select the light emitting pattern corresponding to the number of counting.

* * * * *